US006799314B2

(12) United States Patent
Beniyama et al.

(10) Patent No.: US 6,799,314 B2
(45) Date of Patent: Sep. 28, 2004

(54) WORK FLOW MANAGEMENT METHOD AND WORK FLOW MANAGEMENT SYSTEM OF CONTROLLING A WORK FLOW

(75) Inventors: Nobuo Beniyama, Kawasaki (JP); Atsuhito Suzuki, Yokohama (JP); Takato Kusama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 566 days.

(21) Appl. No.: 09/908,590

(22) Filed: Jul. 20, 2001

(65) Prior Publication Data

US 2002/0091559 A1 Jul. 11, 2002

(30) Foreign Application Priority Data

Dec. 20, 2000 (JP) ........................................ 2000-391835

(51) Int. Cl.[7] .................................................. G06F 9/44
(52) U.S. Cl. ...................................... 717/100; 717/127
(58) Field of Search ................................ 717/100–103, 717/120, 127, 131; 707/200; 705/7–9

(56) References Cited

U.S. PATENT DOCUMENTS

| 6,058,393 | A | * | 5/2000 | Meier et al. | 717/124 |
| 6,253,369 | B1 | * | 6/2001 | Cloud et al. | 717/136 |
| 6,324,683 | B1 | * | 11/2001 | Fuh et al. | 717/124 |
| 6,405,210 | B1 | * | 6/2002 | Doyle et al. | 717/108 |
| 6,636,857 | B2 | * | 10/2003 | Thomas et al. | 717/173 |

OTHER PUBLICATIONS

Clymer et al. Optimizing Production Work Flow Using OPEMCSS. Proceeding of the 2000 Winter Simulation Conference. pp. 1305–1314.*
Park et al. Deadlock Avoidance in Sequential Resource Allocation Systems With Multiple Resource Acquisitions and Flexible Routings. IEEE. 2001. pp. 1572–1583.*
Pinci et al. Work Flow Analysis. Proceeding of the 1993 Winter Simulation Conference. pp. 1122–1130.*

* cited by examiner

Primary Examiner—Wei Zhen
(74) Attorney, Agent, or Firm—Antonelli, Terry, Stout & Kraus, LLP

(57) ABSTRACT

A work flow management method for managing execution of a plurality of works in a business process based on process definition information for defining the plurality of works and a processing order of the works. Control information is held for storing each work and the number of times a application program can execute processing associated with the work in correspondence to each other. When the application program for performing the processing associated with the work must be executed, it is determined whether the number of times the application program has already been executed is less than a predetermined value stored in the control information corresponding to the work which must be executed. The application program which must be executed is executed when the number is less than the predetermined value.

25 Claims, 24 Drawing Sheets

FIG. 3

| PROCESS DEFINITION NAME | WORK DEFINITION NAME | WORK TYPE | OPERATOR | APPLICATION PROGRAM INFORMATION |
|---|---|---|---|---|
| PD1 | A | OPERATOR EXECUTION | YAMADA | — |
| PD1 | B | AUTOMATIC EXECUTION | — | PROGRAM1 |
| PD1 | C | AUTOMATIC EXECUTION | — | PROGRAM2 |
| PD1 | D | OPERATOR EXECUTION | SUZUKI | — |
| PD2 | ... | ... | ... | ... |

FIG. 4

| PROCESS DEFINITION NAME | CONTROL NODE NAME | NODE TYPE |
|---|---|---|
| PD1 | s | START |
| PD1 | e | END |
| PD1 | x | BRANCH |
| PD1 | y | JOINT |
| PD2 | . . . | . . . |

| PROCESS DEFINITION NAME | SOURCE | DESTINATION |
|---|---|---|
| PD1 | s | A |
| PD1 | A | B |
| PD1 | B | x |
| PD1 | x | C |
| PD1 | x | D |
| PD1 | C | y |
| PD1 | D | y |
| PD1 | y | e |
| PD2 | . . . | . . . |

FIG. 6

| PROCESS INSTANCE NAME | PROCESS DEFINITION NAME | WORK DEFINITION NAME | STATUS | OPERATOR |
|---|---|---|---|---|
| PI1 | PD1 | A | COMPLETED | YAMADA |
| PI1 | PD1 | B | READY | — |
| PI1 | PD1 | C | INITIAL | — |
| PI1 | PD1 | D | INITIAL | SUZUKI |
| PI2 | PD1 | A | INITIAL | YAMADA |

FIG. 10

| SCHEDULING CONTROL UNIT NAME | PROCESS DEFINITION NAME | WORK DEFINITION NAME | PRIORITY LEVEL |
|---|---|---|---|
| SC1 | PD2 | A2 | MIDDLE |
| SC1 | PD2 | B2 | MIDDLE |
| SC2 | PD3 | A3 | MIDDLE |
| SC2 | PD3 | B3 | MIDDLE |
| SC3 | PD2 | C2 | HIGH |
| SC3 | PD3 | C3 | LOW |

FIG. 11

| PROCESS DEFINITION NAME | WORK DEFINITION NAME | INSTANCE NAME | APPLICATION PROGRAM INFORMATION | CREATED DATE/TIME |
|---|---|---|---|---|
| PD2 | A2 | P1 | PROGRAM A | '00/08/08/-12:00 |
| PD2 | B2 | P2 | PROGRAM B | '00/08/08/-10:00 |
| PD3 | A3 | P3 | PROGRAM A | '00/08/07/-12:00 |
| PD3 | B3 | P4 | PROGRAM B | '00/08/08/-09:00 |
| PD2 | C2 | P5 | PROGRAM C | '00/08/09/-12:00 |
| PD3 | C3 | P6 | PROGRAM C | '00/08/08/-18:00 |

FIG. 19

| USER NAME | PROCESS DEFINITON NAME | CONTRACT FORM | PRIORITY LEVEL | EXECUTION MULTIPLICITY |
|---|---|---|---|---|
| USR1 | APD1 | FIXED | MIDDLE | 3 |
| USR1 | APD2 | FIXED | MIDDLE | 5 |
| USR2 | APD3 | FIXED | MIDDLE | 2 |
| USR3 | APD4 | SHARED | MIDDLE | 10 |
| USR4 | APD5 | SHARED | HIGH | 10 |
| USR5 | APD6 | SHARED | LOW | 10 |

FIG. 21

| APPLICATION PROGRAM INFORMATION | USABLE MEMORY AMOUNT (COMPUTER RESOURCE1) | USABLE DISK AMOUNT (COMPUTER RESOURCE 2) |
|---|---|---|
| PROGRAM 1 | 1 MB | 10 MB |
| PROGRAM 2 | 10 MB | 100 MB |
| PROGRAM 3 | 50 MB | 50 MB |
| PROGRAM 4 | 30 MB | 200 MB |
| | | |

FIG. 22

| SCHEDULING CONTROL UNIT NAME | MAXIMUM USABLE MAMORY AMOUNT (COMPUTER RESOURCE 1) | MAXIMUM USABLE DISK AMOUNT (COMPUTER RESOURCE 2) |
|---|---|---|
| SC1 | 1 GB | 4 GB |
| SC2 | 500 MB | 2 GB |
| SC3 | 200 MB | 1 GB |

WORK FLOW MANAGEMENT METHOD AND WORK FLOW MANAGEMENT SYSTEM OF CONTROLLING A WORK FLOW

BACKGROUND OF THE INVENTION

The present invention relates to a technology for controlling a work flow management system.

A work flow management system is a technology for previously defining a flow of business comprised of a plurality of works as a process definition to support the management of work performance and business progress status based on the definition. The process definition may be regarded as modelling of a business flow. While processing in each work may be performed by a human or automatically executed by a application program, the work flow management system controls the assignment of these works to human resources, and execution of the processing by application programs, as well as manages the status and advancement of the overall business flow. The work flow management system has been developed mainly for purposes of improving the productivity of white collar and from a viewpoint of computer-based automation of procedures involved in office activities (David Hollingsworth, Workflow Management Coalition, The Workflow Reference Model, TC00-1003, January 1995, Chap. 2).

Such work flow management systems began to be utilized in relatively small scaled system configurations mainly as groupware, and have been gradually utilized more in basic businesses. Now, these systems are applied in larger scale to high throughput systems. For example, JP-A-11-213082 entitled "Work Flow Management Apparatus and Work Flow Management System and Computer Readable Storage Medium Having Stored Thereon These Programs" describes a method of efficiently managing a work flow in a large scaled work flow management system.

In a work flow management system, a work flow execution control engine manages the execution of a work flow in accordance with a process definition. Generally, in a work flow management system, business flows are simultaneously progressed for a plurality of process instances, so that if a large amount of process instances are simultaneously introduced, the work flow execution control engine is heavily loaded with the processing involved in the work flow execution management. On the other hand, since the number of works executable at certain time is also increased, the work flow execution control engine is required to perform scheduling for the execution of application program processing and load control if the works are processed by application programs without intervention of humans.

The above-referenced invention describes a technology for solving the problem of an increased load of work flow execution management by distributing the load of work flow execution management to a plurality of work flow execution control engines.

SUMMARY OF THE INVENTION

The prior art technology experiences difficulties in appropriately scheduling the application program processing for controlling the load in accordance of a modeled business flow since the load control and processing scheduling must be performed on a application program side independently of the process definition in consideration of the allocation of computer resources.

It is an object of the present invention to provide a work flow management method and system which consider the allocation of computer resources used by application programs which process works.

In the present invention, to solve the above problem, when a application program for processing the work must be executed, it is determined whether the number of the application programs under execution or the amount of computer resource available therefor is equal to or less than a predetermined value stored corresponding to the work which must be processed. The application program which must be executed is executed when the predetermined value is not exceeded.

In this way, it is possible to provide a work flow management method and system which consider the allocation of computer resources used by application programs for processing respective works.

BRIEF DESCRIPTION OF THE DRAWINGS

FIG. 3 is a diagram showing the structure of a definition information storage table for a process definition 0121 shown in FIG. 1;

FIG. 4 is a diagram showing the structure of a definition information storage table for the process definition 0121 shown in FIG. 1;

FIG. 5 is a diagram showing the structure of a definition information storage table for the process definition 0121 shown in FIG. 1;

FIG. 6 is a diagram showing the structure of a storage table for work flow execution status information 0122;

FIG. 10 is a diagram showing the structure of a definition information storage table for the application program execution schedule definition 0712;

FIG. 11 is a diagram showing the structure of a storage table for a application program execution request 0711;

FIG. 19 is a diagram showing the structure of a storage table for user management information 1711 shown in FIG. 17;

FIG. 21 is a diagram showing the structure of a application program usable resource information table 2101 in an embodiment in which general computer resources are limited;

FIG. 22 is a diagram showing the structure of an expanded scheduling control unit definition information table 2201 in the embodiment in which general computer resources are limited;

DESCRIPTION OF THE EMBODIMENTS

One embodiment of the present invention will hereinafter be described with reference to the accompanying drawings.

It should be first noted that although an exemplary work flow management system in the following embodiment is simplified as compared with a general work flow management system due to omission of functions and details which are deemed as unnecessary for describing the present invention, this is not at all intended to limit an applicable scope of the present invention.

Figure 1:
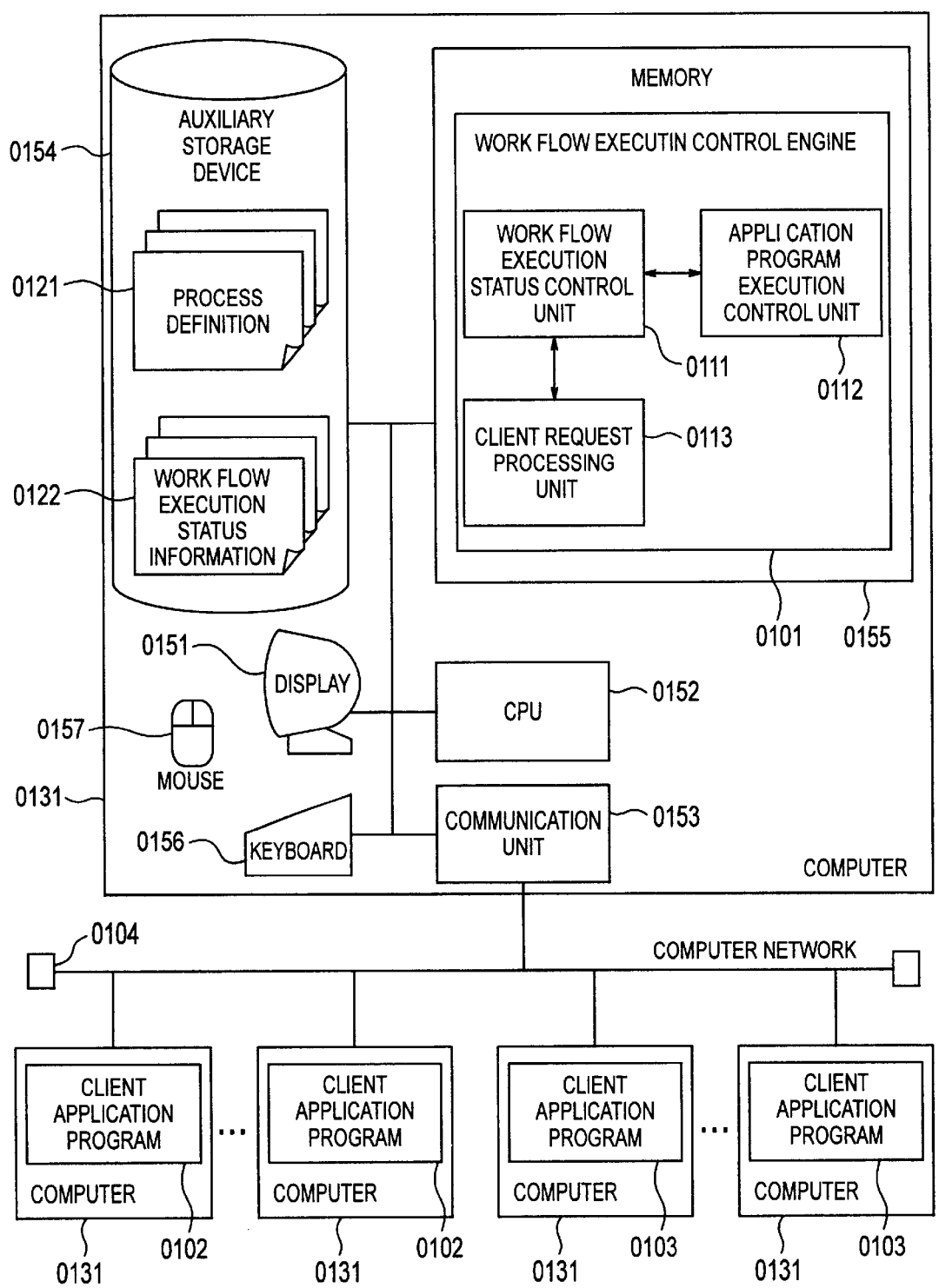
FIG. 1 is a block diagram illustrating the system configuration of a work flow management system according to one embodiment of the present invention.

FIG. 1 illustrates an exemplary configuration of a work flow management system according to the present invention.

A computer 0131 comprises hardware components such as a display 0151, a CPU 0152, a communication unit 0153, an auxiliary storage device 0154, a memory 0155, a keyboard 0156, and a mouse 0157. While the detailed configuration within the computer is described only for the single computer 0131 for simplicity, other computers 0131 may have a similar hardware configuration. A work flow execution control engine 0101, a client application program 0102, and automatically executed application programs 0103 are software programs which run on the computer 0131. These software programs, which are stored in the auxiliary storage device 0154, are read into the memory 0155 upon execution, and executed by the CPU 0152. Also, these software programs can interact with a human operator through input devices such as the display 0151, keyboard 0156 and mouse 0157, and mutually communicate with software programs running on other computers, using the communication unit 0203. Further, each of these programs may be placed on the same computer 0131 or on different computers 0131 interconnected through a computer network 0104.

The work flow execution control engine 0101 manages work and business flow execution status based on a process definition 0121 which describes a processing procedure for predefined works. Also, the work flow execution control engine 0101 accepts a processing request from the client application program 0102 through the computer network 0104, and transmits the processing request to any of the automatically executed application programs 0103. The operation of the work flow execution control engine 0101 will be described later in greater detail.

The client application program 0102, which is directly manipulated by a human operator, acquires a list of works assigned to the operator from the work flow control engine 0101 for displaying the list, and performs business processing for the assigned works. The client application program 0102 also notifies the work flow execution control engine 0101 of the completion of the works after the business processing for the works has been completed.

Each of the automatically executed application program 0103 accepts a business processing execution request from the work flow execution control engine 0101, performs business processing for works without intervention of a human operator, and returns a completion notice after the business processing has been completed.

Figure 2:
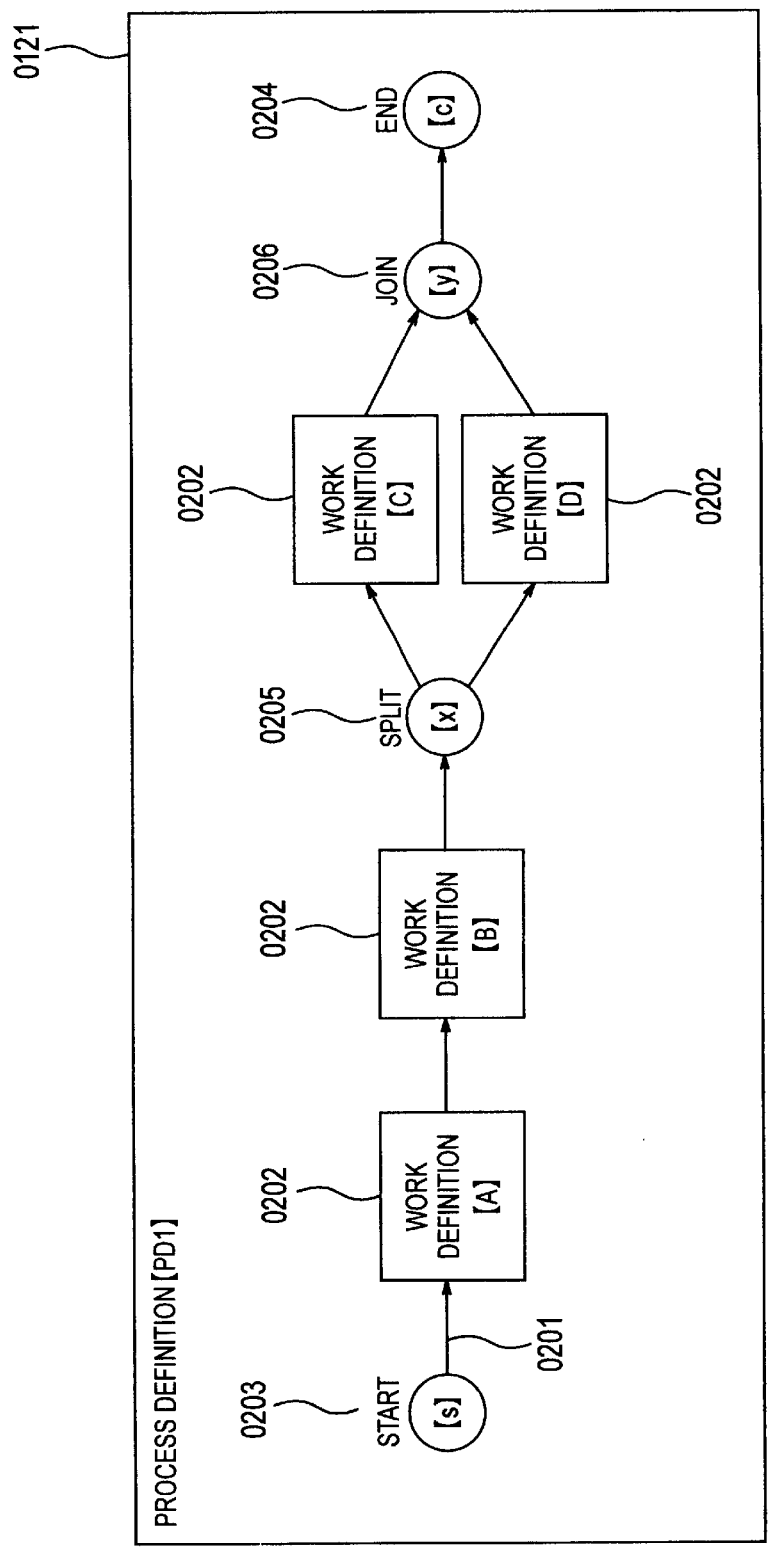
FIG. 2 is a flow diagram illustrating an exemplary process definition for the work flow management system in the embodiment of the present invention.

A plurality of predefined process definitions 0121 can be stored in the auxiliary storage device 0154. FIG. 2 illustrates a definition concept of the process definition 0121. The process definition 0121 is represented as a directed graph which has a plurality of work definitions 0202 linked by arrows 0201. A start point, an end point, a split point and a join point of the graph are represented by special nodes, called control nodes, on the directed graph. Nodes 0203–0306 in FIG. 2 are the control nodes which represent the start node 0203, end node 0204, split node 0205 and join node 0206, respectively. The directed graph starts at the start node 0203 and ends at the end node 0204. Details on the process definition 0121 illustrated in FIG. 2 and formats for storing data associated therewith in the auxiliary storage device 0154 are shown in FIGS. 3 to 5. FIG. 3 shows in detail a work definition information table 0311 for storing definition information on work definitions 0202 included in the process definition 0121; FIG. 4 shows in detail a control node definition information table 0411 for storing definition information on the control nodes 0203–0206 included in the process definition 0121; and FIG. 5 shows in detail an arrow definition information table 0511 for storing definition information on the arrows 0201 which connect between the work definitions 0211 and the control nodes 0203–0206. Since either of the tables stores information on a plurality of process definitions 0121, the table has a process definition name on the first column (columns 0301, 0401, 0501 in the respective figures) for identifying a particular process definition 0121 to which definition information belongs. In the following, columns of the respective tables will be described in detail for each of the figures.

Referring first to FIG. 3, a work definition name 0302 is a name for uniquely identifying a work definition 0202. A work type 0303 may take one of two values, "operator execution" and "automatic execution" for specifying whether the processing for a work in the work definition is executed by a human operator through manipulation on the client application program 0102 ("operator execution") or executed without intervention of the human operator by the work flow execution control engine 0101 which issues a processing request to one of the automatically executed application programs 0103 ("automatic execution"). An operator 0304 specifies a name for identifying an operator who is to process the work when the work type 0303 indicates "operator execution." Application program information 0305 specifies information for identifying an automatically executed application program 0103 which is to execute processing associated with the work when the work type 0303 indicates "automatic execution."

Referring next to FIG. 4, a control node name 0402 is a name for uniquely identifying definition information for the control nodes 0203–0206. A node type 0403 may take one of four values "start," "end," "split" and "join" for indicating the type of the associated control node.

Referring next to FIG. 5, a source 0502 and a destination 0503 each specify a work definition name 0302 or a control node name 0402 of two work definitions 0202 or control nodes 0203–0206, when connected by an arrow 0201.

Work flow execution status information 0122 stores the execution status of a work or a business flow for each process instance in the auxiliary storage device 0154 in the work and business flow execution status management made by the work flow execution control engine 0101. FIG. 6 shows in detail a format in which the work flow execution status information 0122 is stored in the auxiliary storage device 0154. Each of records in a status management table 0611 shown in FIG. 6 holds the status of each of works in a process instance. A process instance name 0601 is a name for uniquely identifying each of process instances. A process definition name 0602 indicates a process definition 0121 which is a model of the process instance. A work definition name 0603 identifies a work definition 0202 which is a model of a work, the status of which is held. Status 0604 represents the execution status of a work, and may take one of three values, "Initial," "Ready" and "Completed." The "initial" status indicates the initial status of a work, and is taken by all works at the outset of the process instance. The "Ready" status indicates that the processing for a work can be started. The "Complete" status indicates the completion of the processing for a work. An operator 605 is the name of an operator who is to perform a work when the work type is "operator execution."

Next, the operation of the work flow execution control engine 0101 will be described.

As illustrated in FIG. 1, the work flow execution control engine 0101 is comprised of sub-programs, a work flow execution status control unit 0111, a application program execution control unit 0112, and a client request processing unit 0113.

The client request processing unit 0113 accepts from the client application program 0102 three types of commands, a work list acquisition command "GetWorkList," a work completion notification command "CompleteWork" and a process instance start command "StartProcess." The "GetWorkList" command receives an operator name as an input, and outputs a work name list which enumerates works assigned to the operator. The "CompleteWork" command receives a process instance name and a work definition name as inputs, and notifies the work flow execution status control unit 0111 of the completion of processing involved in a work for a specified work definition name of a specified process instance. The "StartProcess" command receives a process instance name and a process definition name as inputs, and requests the work flow execution status control unit 0111 to start a process instance for a specified process definition with a specified process instance name.

The work flow execution status control unit 0111 appropriately changes the work flow execution status 0122 in accordance with the process definition 0121 in response to the "StartProcess" command and "CompleteWork" command accepted by the client request processing unit 0113. Upon accepting the "StartProcess" command, the work flow execution status control unit 0111 searches the work definition information table 0311 for information on each work definition 0202 defined in the specified process definition 0121, using the process definition name as a key, and inserts a record of a work corresponding to each work definition 0202 into the status management table 0611. In this event, the status 0604 for each work is set to the "Initial" status. Also, the work flow execution status control unit 0111 sets a process instance name and a process definition name specified upon-acceptance of a command in the respective columns, process instance name 0601 and process definition name 0602, respectively, and sets the work definition name 0302 and operator 0304, which are attribute information to the work definition 0202 corresponding to the record, in respective columns, work definition name 0603 and operator 0605. Further, the work flow execution status control unit 0111 determines the work definition 0202 which should be first executed, tracing from the start node 0203 along the directed graph for the process definition 0121, and the status 0605 for a work corresponding to the work definition in the "Ready" status. In this event, if the work type 0303 of the work definition 0202 is "automatic execution," the work flow execution status control unit 0111 requests the application program execution control unit 0112 to execute the business processing using an automatically executed application program. Upon accepting the "CompleteWork" command, the work flow execution status control unit 0111 sets the status of a work for a specified work definition of a specified process instance in the "Completed" state, determines a work definition to be executed next to the current work definition along the directed graph of the process definition 0121, and sets the status 0605 of the work for the work definition to be next executed in the "Ready" status. In this event, if the work type 0303 is "automatic execution," the work flow execution status control unit 0111 requests the application program execution control unit 0112 to execute the business processing using an automatically executed application program, as described above.

The application program execution control unit 0112 transmits a request for executing the business processing to the automatically executed application program in response to the execution request made by the work flow execution status control unit 0111 for executing the business processing using the automatically executed application program, and receives a completion notice after the completion of the business processing. Further, the application program execution control unit 0112 notifies the work flow execution status control unit 0111 of the completion of the business processing. In this event, the work flow execution status control unit 0111 performs similar processing as it does when accepting the "CompleteWork" command. In this way, the business flow can be transitioned to the work which is to be processed next in the process definition 0121.

By now, description has been made on the configuration of the work flow management system according to one embodiment of the present invention.

Next, the operation of the application program execution control unit 0112 which adds functions that characterize the present invention will be described in detail in the foregoing work flow management system.

Figure 7:
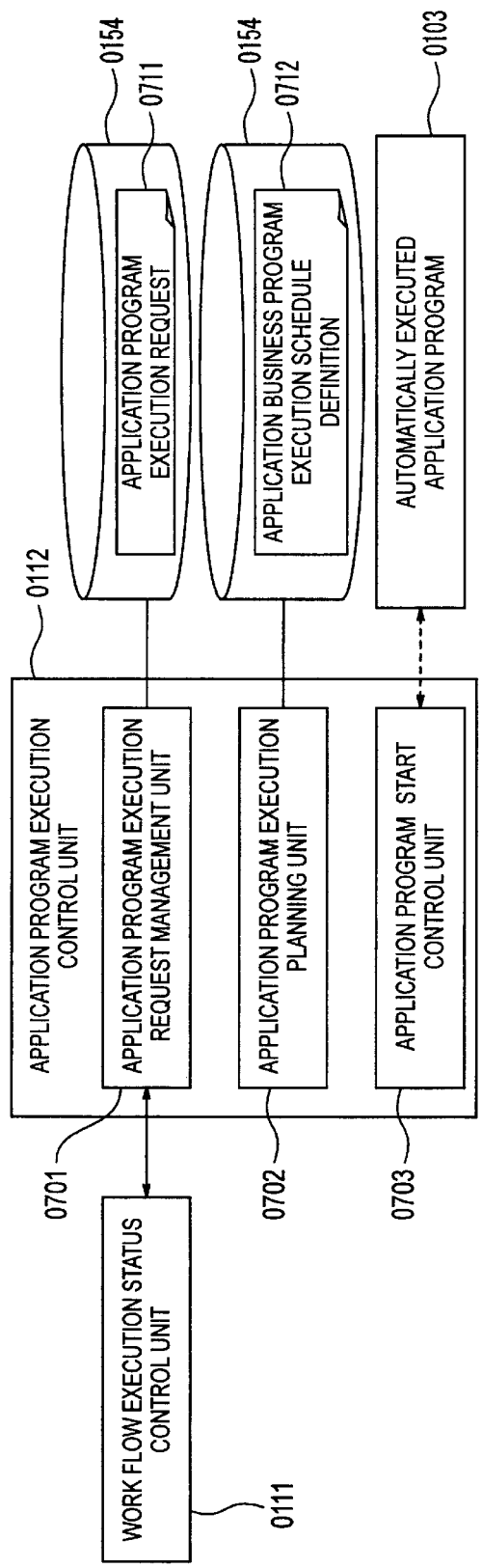
FIG. 7 is a block diagram illustrating in detail the configuration of a application program execution control unit 0112 in FIG. 1.

As illustrated in FIG. 7, the application program execution control unit 0112 in the present invention further comprises sub-programs, i.e., a application program execution request management unit 0701, a application program execution planning unit 0702, and a application program invocation control unit 703. The application program execution request management unit 0701 once stores a request for executing business processing to the automatically executed application program 0103, received from the work flow execution status control unit 0111, in the auxiliary storage unit 0154 (a application program execution request 0711 in FIG. 7), and manages the stored request until it is processed at appropriate timing in accordance with an execution plan for the application program execution planning unit 0702. The application program execution planning unit 0702 makes an execution plan in response to the application program execution request 0711 based on a application program execution schedule definition 0712 which has previously defined an execution planning method for planning the execution of the business processing by the automatically executed application program 0103, and sends a request for executing the business processing, determined to be executed by the automatically executed application program, to the application program invocation control unit 0703. Subsequently, at the time the automatically executed application program 0103 completes the business processing, the application program execution planning unit 0702 receives a completion notice from the application program invocation control unit 0703. The application program invocation control unit 0703 transmits a request for executing the business processing to the automatically executed application program 0103, and receives a completion notice after the automatically executed application program 0103 has completed the processing.

Figure 8:
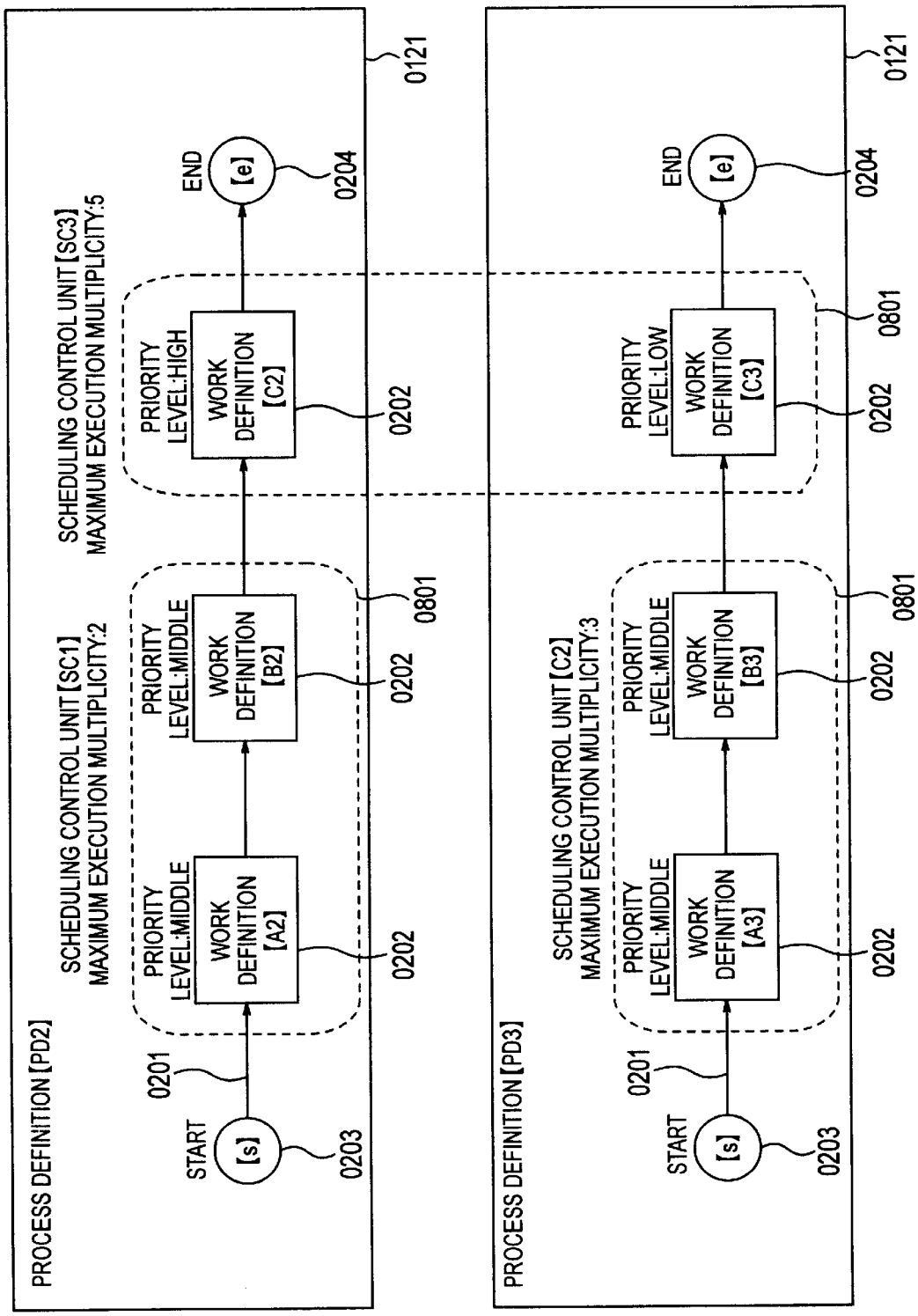
FIG. 8 is a flow diagram illustrating an exemplary definition for a application program execution schedule definition 0712.

FIG. 8 illustrates a method of defining the application program execution schedule definition 0712, and a specific example of definition in this embodiment. The application program execution schedule definition 0712 is described across one or more process definitions 0121 which have been defined and registered in the work flow management system. First, a set of one or more work definitions 0202, called a "scheduling control unit 0801," is defined. In this event, the work type for work definitions 0202 included in the scheduling control unit 0801 is limited only to "automatic execution." Next, an execution planning method within the scheduling control unit 801 is specified for each scheduling control unit 0801. The execution planning method within the scheduling control unit 0801 may be specified based on two ways: maximum execution multiplicity (specified for each scheduling control unit 0801) and priority of processing among work definitions (specified for each work definition 0202). The priority can be specified at three levels, "high," "middle" and "low." The maximum execution multiplicity is a set value indicating an upper limit of business processing which can be simultaneously executed by the automatically executed application program 0103 in the scheduling control unit 0801. The priority specifies a priority level for each work definition 0202 in an execution order in which the business processing is executed by the automatically executed application program 0103 within the same scheduling control unit 0801. Within the same scheduling control unit 0801, a request for executing the business processing to the automatically executed application program in a work definition, to which a higher priority level is specified, is executed earlier. In FIG. 8, the priority level is described above each work definition 0202, and the execution multiplicity is likewise described above each scheduling control unit.

Figure 9:
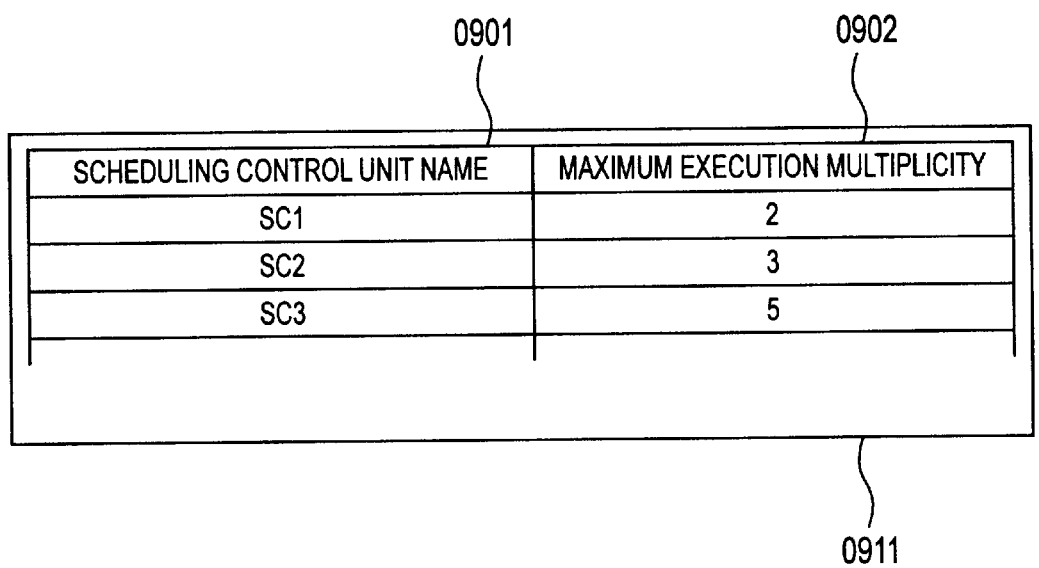
FIG. 9 is a diagram showing the structure of a definition information storage table for the application program execution schedule definition 0712.

FIGS. 9 and 10 show a format in which the application program execution schedule definition 0712 is stored in the auxiliary storage device 0154, and the exemplary definition illustrated in FIG. 8 when stored in the auxiliary storage device 0154, respectively. FIG. 9 shows a scheduling control unit definition information table 0911 for storing definition information on the scheduling control unit 0801 included in the application program execution schedule definition 0712, and FIG. 10 shows a scheduling control unit work definition information table 1011 for storing definition information on work definitions 0202 included in each scheduling control unit 0801, the work type of which is "automatic execution."

In FIG. 9, a scheduling control unit name 0901 is a name for uniquely identifying each scheduling control unit 0801. A maximum execution multiplicity 0902 is a value for specifying a maximum execution multiplicity for the scheduling control unit 0801.

In FIG. 10, a process definition name 1002 and a work definition name 1003 are provided for identifying a work definition 0202 included in the schedule control unit 0801. A scheduling control unit name 1001 is provided for identifying a scheduling control unit 0801 which contains a work definition 0202 identified by the process definition 1002 and the work definition name 1003. A priority level 1004 is a specified value for the priority of the work definition 0202 in the scheduling control unit 0801.

FIG. 11 shows a format in which the application program execution request 0711 is stored in the auxiliary storage device 0154. Each application program execution request 0711 is stored in a record within a application program execution request management table 1111. A process definition name 1101, a work definition name 1102 and a process instance name 1103 are provided for uniquely identifying a work (classified as "automatic execution") which is the originator of an execution request. Application program information 1104 is information acquired from the column 0305 labeled "application program information" in the work definition information table 0311 for identifying an automatically executed application program 0103 for executing the business processing for the execution request. A created date/time 1105 indicates the date and time at which the execution request was created.

In the following, details on the operation of each of the components in the application program execution control unit 0112 will be described in order.

First, the operation of the application program execution request management unit 0701 will be described in detail. The application program execution request management unit 0701 executes two types of processing: "execution request registration processing" invoked by the work flow execution status control unit 0111, and "execution request acquisition processing" invoked by the application program execution planning unit 0702. The work flow execution status control unit 0111 invokes the "execution request registration processing" when a work with the work type classified as "automatic execution" has been newly set in the "Ready" status for registering a request for executing the business processing by the automatically executed application program 0103 in the application program execution request management unit 0701. In this event, the work flow execution status control unit 0111 retrieves information related to a work for which a request for executing the business processing (process instance name 0601, process definition name 0602, work definition name 0603, application program information 0305) from the status management table 0611 and the work definition information table 0311, and passes the retrieved information to the application program execution request management unit 0701. The application program information 0305 can be acquired by searching the work definition information table 0311 for work definition information related to the work using the process definition name 0301 and work definition name 0302 as keys.

In the following, a processing procedure for the "execution request registration processing" will be described in sequence. First, the application program execution request management unit 0701 receives a request for execution by a automatically executed application program 0103 from the work flow execution status control unit 0111. In this event, the work program execution control unit 0701 can receive the process definition name, work definition name, process instance name and application program information as attribute information of the execution request. Next, the work program execution control unit 0701 acquires the current date and time, and inserts the execution request received from the work flow execution status control unit 0111, together with the acquired current date and time, into the application program execution request management table 1111. The current date and time can be known, for example, by invoking a system call provided by the operating system. Finally, the application program execution request management unit 0701 notifies the application program execution planning unit 0702 that a new execution request has been issued. In this way, the application program execution request management unit 0701 can trigger an execution plan processing in the application program execution planning unit 0702. The execution plan processing starting trigger will be described later.

Figure 12:
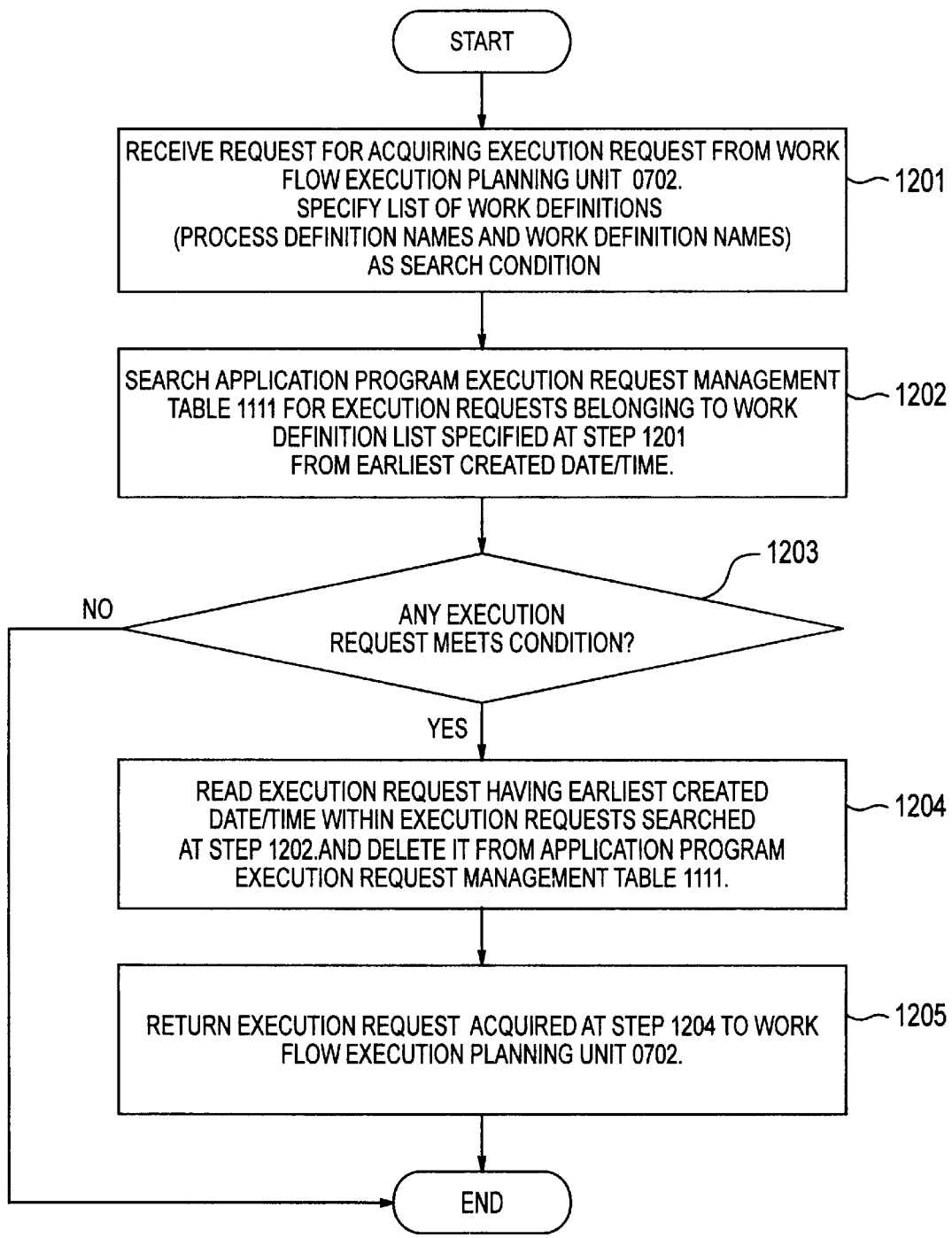
FIG. 12 is a flow chart illustrating the operation of an execution request acquisition procedure performed by a application program execution request management unit 0701.

Next, a processing procedure for the "execution request acquisition processing" will be described with reference to a flow chart of FIG. 12. The application program execution request management unit 0701 specifies a list of work definitions (a set of process definition name and work definition name) to invoke the "execution request acquisition processing" (step 1201). Then, the application program execution request management unit 0701 searches the application program execution request management table 1111 for execution request belonging to the work definition list passed thereto at step 1201, and sorts the retrieved execution requests in order from the earliest created date/time (step 1202). If no execution request meets conditions, the processing is terminated (step 1203). If any execution request meets the conditions, the procedure goes to step 1204. The application program execution request management unit 0701 reads the record of the earliest execution request out of the execution requests retrieved at step 1202, and deletes it from the application program execution request management table 1111 (step 1204). The execution request acquired at step 1204 is returned to the application program execution planning unit 0702 (step 1205).

Next, the operation of the application program execution planning unit 0702 will be described in detail. The application program execution planning unit 0702 performs three types of processing which comprises "initial processing," "execution planning processing" and "completion notice reception processing." In the following, details on the respective processing will be described in order.

First shown is a processing procedure for the "initial processing" performed by the application program execution planning unit 0702 only once when the work flow execution control engine 0101 is started. First, the unit 0702 searches the scheduling control unit definition information table 0911 in the application program execution schedule definition 0712 to acquire a list of scheduling control units. Next, the unit 0702 reserves a variable region (execution number counter) for holding the number of times each automatically executed application program 0103 has executed the business processing at a current time for each of the scheduling control units, and initializes the respective execution number counters to zero. Finally, an execution planning processing starting trigger is woken up in the application program execution planning unit 0702. Thus, the processing procedure for the "initial processing" is completed.

Figure 13:
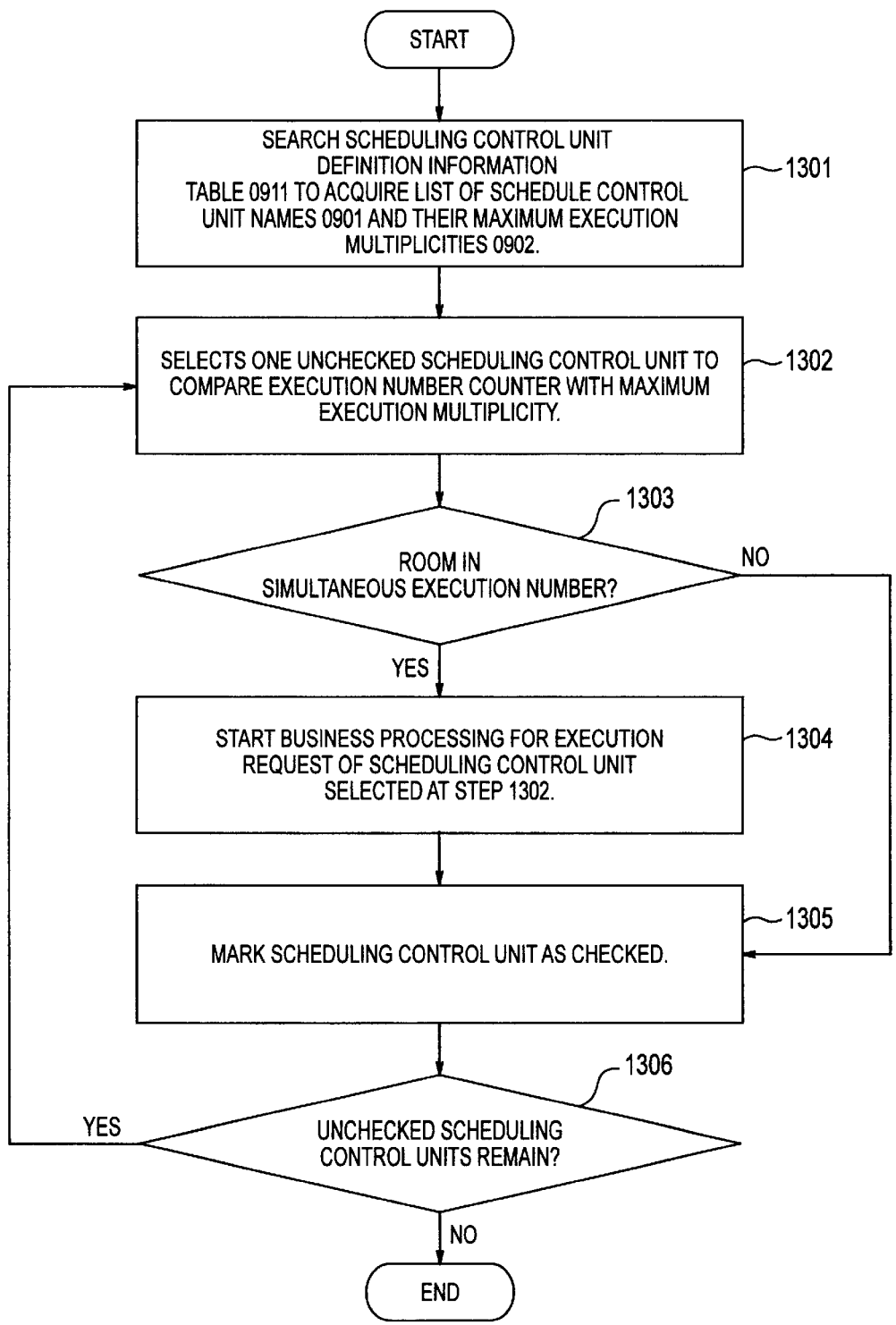
FIG. 13 is a flow chart illustrating the operation of execution plan processing performed by a work flow execution planning unit 0702.
Figure 14:
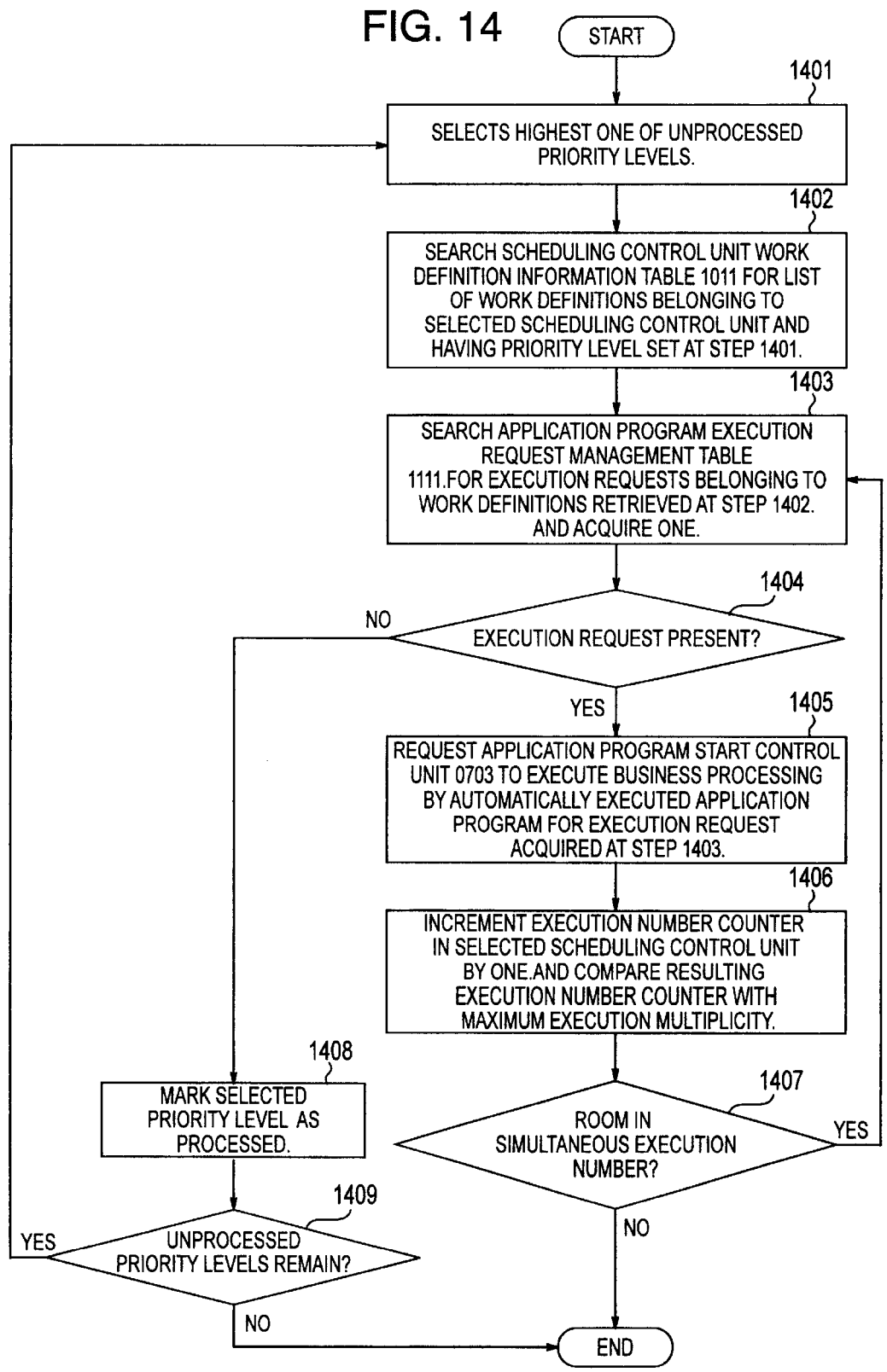
FIG. 14 is a flow chart illustrating details of step 1304 in FIG. 13.

In response to the generation of the execution plan processing starting trigger, the application program execution planning unit 0702 starts the "execution planning processing" for a request for executing the business processing by the automatically executed application program 0103. The "business planning processing" makes a plan for the execution of application program execution requests 0711 stored in the auxiliary storage device 0154 based on the application program execution schedule definition 0712 to determine an execution request which is ready for starting the execution. Also, the "business planning processing" requests the application program invocation control unit 0703 for execution of the business processing by the automatically executed application program 0103 for the execution request which has been determined as ready for starting the execution. FIGS. 13 and 14 illustrate a detailed processing procedure for the "execution planning processing."

The processing procedure illustrated in FIG. 13 compares a current value of the execution number counter with the maximum execution multiplicity for each scheduling control unit to determine a scheduling control unit which has the number of simultaneous executions in reserve. In the following, the processing procedure will be described in detail along the steps of the flow. The application program execution planning unit 0702 acquires a list of scheduling control units from the application program execution schedule definition 0712 to fetch a set value for the maximum execution multiplicity (step 1301). Specifically, the unit 0702 searches the scheduling control unit definition information table 0911 to acquire a list of sets of scheduling control unit names 0901 and corresponding maximum execution multiplicities 0902 (step 1301). Then, the unit 0702 selects an unchecked scheduling control unit to compare a current execution number counter value with the set value for the maximum execution multiplicity (step 1302). At step 1303, if the result of the comparison at step 1302 shows that the selected scheduling control unit does not have the number of simultaneous executions in reserve, the procedure goes to step 1305. Conversely, if the selected scheduling control unit has the number of simultaneous executions in reserve, the procedure goes to step 1304. At step 1304, the application program execution planning unit 0702 starts making execution requests for the automatically executed application program in the scheduling control unit within a limited range of the maximum execution multiplicity. The processing at step 1304 will be described later in greater detail. Then, the scheduling control unit selected at step 1302 is marked as checked (step 1305). If any unchecked scheduling control units still remain, the procedure returns to step 1302, where the application program execution planning unit 0702 selects a next scheduling control unit for which similar processing is repeated (step 1306). When the procedure has been completed for all the scheduling control units, the "execution planning processing" is terminated.

In the processing illustrated in FIG. 14, the unit 0702 determines the order in which execution requests for the business processing by the automatically executed application program 0103 are executed in the scheduling control unit which has the number of simultaneous executions in reserve, as determined in the processing procedure of FIG. 13. The processing flow illustrated in FIG. 14 represents in greater detail the processing at step 1304 in FIG. 13. In the following, the flow will be described along the steps.

The unit 0702 selects the highest one from unprocessed priority levels (step 1401). Then, the unit 0702 searches the scheduling control unit work definition information table 1011 for a list of work definitions which belong to the scheduling control unit selected at step 1304 in FIG. 13 and have the priority level selected at step 1401 (step 1402).

Next, the unit 0702 specifies the list of work definitions searched at step 1402 to invoke the "execution request acquisition processing" of the application program execution request management unit 0701 (step 1403). In this way, the execution request having the earliest created date/time can be acquired from those belonging to the specified work definitions. When the execution request can be acquired at step 1403, the application program execution planning unit 0702 requests the application program invocation control unit 0703 to execute the business processing by the automatically executed application program 0103 for the acquired execution request (step 1405). In this event, the unit 0702 passes respective attribute values (process definition name 1101, work definition name 1102, process instance name 1103 and application program information 1104) of the acquired execution request to the application program invocation control unit 0703 as parameters. Then, the unit 0702 increments the current execution number counter by one for the scheduling control unit, and compares the current count value with the maximum execution multiplicity in the scheduling control unit (step 1406). If the comparison at step 1406 shows that the scheduling control unit has the number of simultaneous executions in reserve, the flow returns to step 1403 to repeat the processing for another execution request at the same priority level in the scheduling control unit (step 1407). If no execution request has the selected priority level at step 1403, the priority level is marked as processed (step 1408). If unprocessed priority levels still remain, the flow returns to step 1401, where the unit 0702 again selects the next highest priority level and repeats the foregoing processing.

Finally, a processing procedure for the "completion notice reception processing" will be shown. The "complete notice reception processing" is executed when the completion notice indicating that the automatically executed application program 0103 has completed the business processing is received from the application program invocation control unit 0703. This completion notice is generated to the request for executing the business processing by the automatically executed application program 0103, made to the application program invocation control unit 0703 in the "execution planning processing" (step 1405 in FIG. 14). The processing procedure advances in the following manner. First, the unit 0702 receives a business processing completion notice from the application program invocation control unit 0703. At this time, the unit 0702 also receives information for identifying a work (process definition name, work definition name, process instance name) out of the parameters associated with the execution request which were passed upon the request for executing the business processing. Next, the application program execution planning unit 0702 searches the scheduling control unit work definition information table 1011 for a scheduling control unit 0801 which contains the work definition 0202 corresponding to the execution request for which the unit 0702 has received the completion notice, and identifies the scheduling control unit 0801. Further, the application program execution planning unit 0702 decrements by one the current execution number counter in the identified scheduling control unit 0801. Next, the application program execution planning unit 0702 notifies the work flow execution status control unit 0111 of the completion of the business processing for the work associated with the execution request. Finally, an execution plan processing starting trigger is woken up in the application program execution planning unit 0702.

The execution plan processing starting trigger is generated when an execution plan must be executed again in the application program execution planning unit 0702 in the following three process instances. In a first process instance, in which an execution request is newly made, the execution processing starting trigger is generated when the application program execution request management unit 0701 receives an execution request to the automatically executed application program 0103 from the work flow execution status control unit 0111. The generation of the trigger in the "execution request registration processing" of the application program execution request management unit 0701 falls under this process instance. In a second process instance, the execution processing starting trigger is generated when the completion of certain business processing by the automatically executed application program 0103 results in a room for the number of simultaneous executions. The generation of the trigger in the "completion notice reception processing" of the application program execution planning unit 0702 falls under this process instance. In a third process instance, in which the work flow execution control engine 0101 is started, since no business processing has been started by the automatically executed application program 0103, there is enough room for the number of simultaneous executions. The generation of the trigger in the "initial processing" of the application program execution planning unit 0702 falls under this process instance.

Finally, the application program invocation control unit 0703 will be described. The application program invocation control unit 0703 transmits a business processing execution request to the automatically executed application program 0103, and receives a completion notice after the automatically executed application program 0103 has completed the business processing. In this embodiment, a communication between the application program invocation control unit 0703 and the automatically executed application program 0103 is performed by the communication unit 0153 through the computer network 0104. However, in other embodiments, a variety of communication means can be employed. For example, when the application program invocation control unit 0703 and the automatically executed application program 0103 are operating in the same computer 0131, inter-process communication means provided by the operating system may be utilized, such as a pipe, signal, shared memory, and so on. In this event, the start and end of a process associated with the automatically executed application program 0103 may be controlled by the application program invocation control unit 0703.

By now, the operation of each of the components constituting the application program execution control unit 0112 has been described.

Next, for purposes of helping understanding the operation of the application program execution control unit 0112, specific example will be given to how execution planning processing is performed in a combination of the exemplary process definition and application program execution schedule definition shown in FIGS. 8 to 10, and the exemplary format shown in FIG. 11 in which application program execution requests are stored in the auxiliary storage device 0154.

In the exemplary application program schedule definition shown in FIGS. 8 to 10, three scheduling control units ("SC1," "SC2" and "SC3") are defined on two process definitions ("PD2" and "PD3"). Two work definitions belong to each of the scheduling control units, i.e., "SC1" contains "PD2:A2" and "PD2:B2"; "SC2" contains "PD3:A3" and "PD3:B3"; and "SC3" contains "PD2:C2" and "PD3:C3" (where as a notation for specifying a work definition, a process definition name is described with a colon ":" as delimiter before a work definition name. When a process definition name is apparent from the context, it may be omitted). The maximum execution multiplicity is specified for each of the scheduling definition units, i.e., 2 for "SC1"; 3 for "SC2"; and 5 to "S3." The application program execution control unit 0112 controls such that the number of simultaneously executed business processing by the automatically executed application program 0103 in all work definitions 0202 included in each scheduling control unit 0801 does not exceed the specified maximum execution multiplicity. Within these work definitions, priority levels "high" and "low" are assigned to the two work definitions "PD2:C2" and "PD3:C3" belonging to the schedule control unit "SC3," respectively. The priority level assigned to the remaining work definitions is "middle." The priority level thus specified is indicated to the application program execution control unit 0112 in order to handle the business processing by the automatically executed application program 0103 in each scheduling control unit 0801 in accordance with the priority levels specified for the respective work definitions. In the shown example of definition, the business processing in the work definition "PD2:C2" is preferentially executed over the business processing in the work definition "PD3:C3" in the scheduling control unit "SC3." In the remaining scheduling control units "SC1" and "SC2," since all the work definitions have the same priority level, associated business processing is evenly executed in the order of created date/time with no difference caused by the work definitions. Assume herein that all of these work definitions are classified as the "automatic execution" work type, and that the work definitions "PD2"A2" and "PD3:A3" both use a application program "Program A"; the work definitions "PD2:B2" and "PD3:B3" both use a application program "Program B"; and the work definition "PD2:C2" and "PD3:C3" both use a application program "Program C" for executing associated business processing. In other words, the application program names have been described in the column 0305 labeled "application program information" in the work information definition table 0311, corresponding to the respective work definitions.

In accordance with the foregoing exemplary application program schedule definition, the application program execution control unit 0112 makes a plan for executing the business processing by the automatically executed application programs 0103 in the following manner. Assume herein that at the time an execution plan is made, the execution number count is 2 in the scheduling control units "SC1" and "SC2" and 4 in "SC3." In other words, "SC2" and "SC3" have the number of simultaneous executions in reserve, specifically, one extra execution is available in the respective scheduling control unit. The following description is made with reference again to FIGS. 13 and 14 which are flow charts illustrating the operation of the application program execution planning unit 0702.

First, at step 1301, the unit 0702 searches the scheduling control unit definition information table 0911 to acquire "SC1" (with the maximum execution multiplicity equal to 2), "SC2" (with the maximum execution multiplicity equal to 3), and "SC3" (with the maximum execution multiplicity equal to 5) as a list of scheduling control units. Next, at step 1302, the scheduling control unit "SC1" is selected to compare the current execution number count, which indicates 2, with the maximum execution multiplicity equal to 2. In this process instance, since "SC1" does not have the execution number count in reserve (step 1030), the scheduling control unit "SC1" is marked as checked (step 1305). Since the scheduling control units "SC2" and "SC3" still remain as unchecked (step 1306), "SC2" is now selected at step 1302. Since "SC2" has the maximum execution multiplicity equal to 3, having one left available in the number of simultaneous executions, as compared with the current execution number counter which indicates 2, the unit 0702 starts the business processing for the execution request in the scheduling control unit "SC2" at step 1304. The processing at step 1304 is performed as illustrated in the flow chart of FIG. 14, specifically in the following manner.

First, the unit 0702 selects a highest priority "high" at step 1401, and searches for a list of work definitions having the priority level set at "high" which belong to the scheduling control unit "SC2" at step 1402. Since no pertinent work definition exists, no pertinent execution request either exists at step 1403, so that the priority level "high" is marked as processed at step 1408. Next, again at step 1402, the unit 0702 selects a priority level "middle" and acquires the work definitions "PD3:A3" and "PD3:B3" at step 1402 this time. At step 1403, the application program execution planning unit 0702 searches execution requests belonging to these work definitions for the one which has the earliest created date/time, and acquires an execution request for the process instance name "P3" in the work definition "PD3:A3" (the third record from the top in FIG. 11). Next, at step 1405, the automatically executed application program 0103 is instructed to start executing the business processing for the acquired execution request. At step 1406, the application program execution planning unit 0702 increments the execution counter by one. This results in the execution counter set at 3 in the scheduling control unit "SC3," followed by termination of the flow chart of FIG. 14 since the scheduling control unit "SC2" does not have the number of simultaneous executions in reserve as compared with the maximum execution multiplicity equal to 3 (step 1407).

Turning back to FIG. 13, the scheduling control unit "SC2" is marked as checked at step 1305, and the unit 0702 confirms the existence of the unchecked scheduling control unit "SC3" at step 1306. Again, at step 1302, the unit 0702 selects "SC3" which has the maximum execution multiplicity equal to 5.

Since "SC3" has the maximum execution multiplicity in reserve as compared with a current execution number counter which indicates 4, the business processing is started for an execution request in the scheduling control unit "SC3" at step 1304. The processing procedure at step 1304 is illustrated again with reference to FIG. 14.

First, the unit 0702 selects the priority level "high" at step 1401, and searches for a list of work definitions having the priority level set at "high" which belong to the scheduling control unit "SC3" at step 1402. Here, a work definition "PD2:C2" is provided as the result of the search. Next, at step 1403, the unit 0702 searches execution requests belonging to these work definitions for the one which has the earliest created date/time, and acquires an execution request for the process instance name "P" (the fifth record from the top in FIG. 11). Next, at step 1405, the automatically executed application program 0103 is instructed to start executing the business processing for the acquired execution request. At step 1406, the unit 0702 increments the execution counter by one. This results in the execution counter set at 5 in the scheduling control unit "SC3," followed by termination of the flow chart of FIG. 14 since the scheduling control unit "SC3" does not have the number of simultaneous executions in reserve as compared with the maximum execution multiplicity equal to 5 (step 1407).

Turning back again to FIG. 13, the scheduling control unit "SC3" is marked as checked at step 1305, and the unit 0702 confirms the existence of any unchecked scheduling control unit at step 1306. In this event, since all the scheduling control units have already been checked, the "execution planning processing" illustrated in the flow chart of FIG. 13 is completed.

As described above, the application program execution control unit 0112 can appropriately control the execution of the business processing by the automatically executed application program 0103 in accordance with the application program execution schedule definition 0712.

Next, how the aforementioned problem is solved by the present invention will be specifically shown using another exemplary process definition and application program execution schedule definition.

Figure 15:
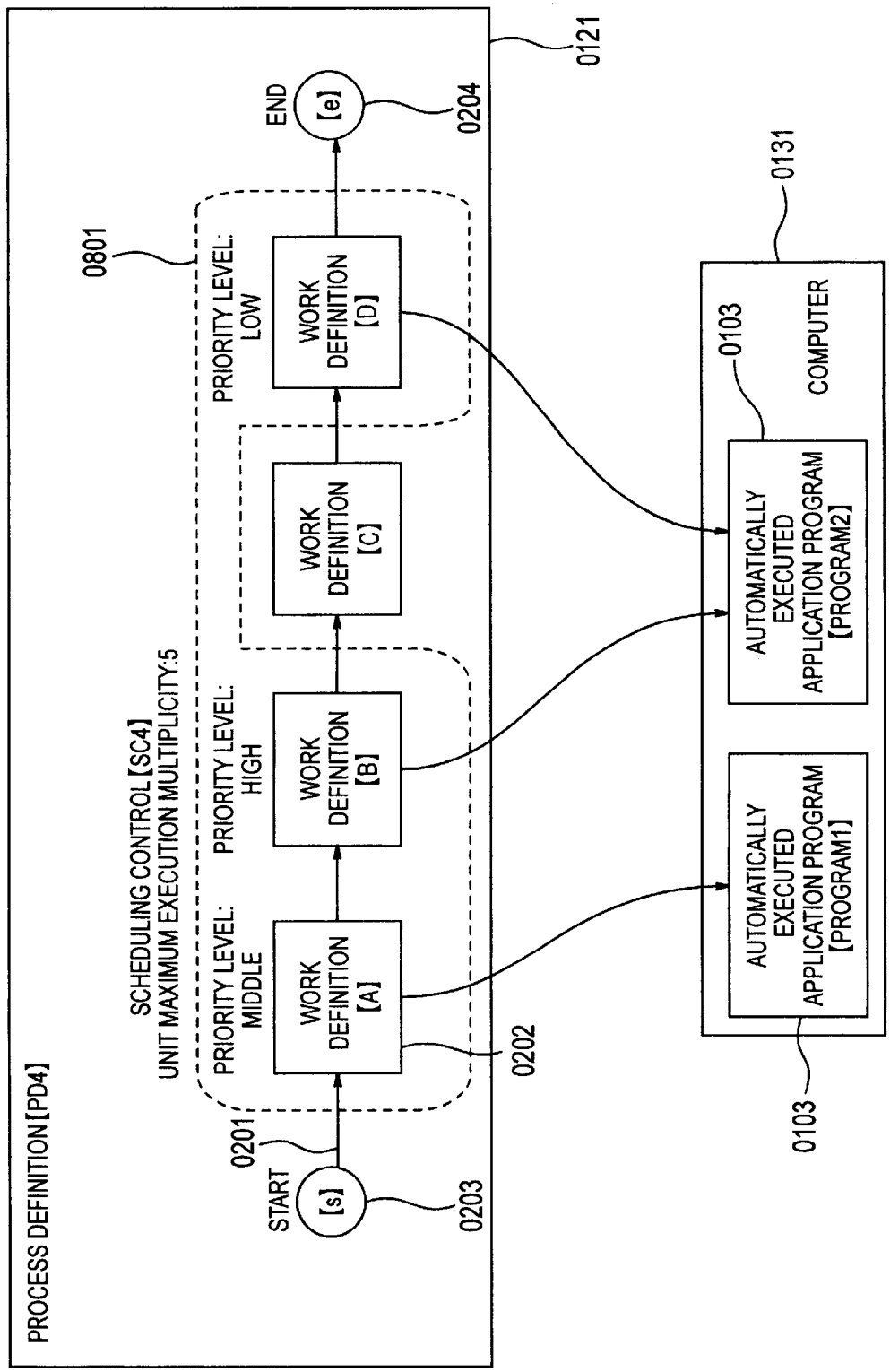
FIG. 15 is a flow diagram illustrating an exemplary definition for the application program execution schedule definition 0712.

In an example illustrated in FIG. 15, a process definition "PD4" is used for sequentially executing four work definitions "A," "B," "C" and "D." Here, the work definitions "A," "B" and "C" are classified as the "automatic execution" work type, while the work definition "C" as the "operator execution" work type. Also, assume that the work definition "A" uses an automatically executed application program "Program 1" for performing business processing; and the work definitions "B" and "C" commonly use the same automatically executed application program "Program 2" for performing business processing. The two automatically executed application programs "Program 1" and "Program 2" run on the same computer. In this event, there are the following two requirements for scheduling the execution of the business processing by the automatically executed application programs 0103. First, since all the automatically executed application programs 0103 run on the same computer 0131, the entire processing load caused by them must be constantly limited. Second, since the operator (human) based business processing has a low throughput, a newly introduced process instance must promptly proceed to the work definition "C" (in which the business processing is performed by an operator). These requirements enables the operator to start the business processing at earlier time and improve the processing efficiency as the entire business flow. For example, when a large number of process instances are introduced at one time through batch processing or the like, if the business processing is executed by the automatically executed application programs 0103 in an order in which works are generated, the business flow will not advance unless the processing is terminated for a sequence of execution requests in the work definition "A," resulting in inefficiency in view of the entire work flow. To meet the foregoing requirements, the application program execution schedule definition may be established in the following manner. First, all works classified as "automatic execution" are defined as a single scheduling control unit "SC4." Thus, the first requirement is met. Next, for meeting the second requirement, the priority level is set higher toward the downstream direction from the work definition "A" to the work definition "B" for purposes of promptly passing process instances to the work definition "C." In this way, the automatically executed application programs 0103 execute the business processing preferentially from process instances located closer to the work definition "C" so that the process instances promptly flow to the work definition "C." While in this embodiment, only three levels "high," "middle" and "low" can be set as the priority levels, the priority may be divided into a larger number of levels in some implementation. Also, the business processing in the work definition "D" is located on the most downstream side of the process definition, so that it does not affect the execution of the business processing by a human operator.

Therefore, the business processing in the work definition "D" may be executed in batch, for example, at the end of a dairy business. It is therefore possible to preferentially use computer resources for the business processing located upstream of the work definition "C" classified as "operator execution" by giving a low priority level to the work definition "D." In the foregoing manner, the second requirement can be met. Such setting of priority can be flexibly performed even between different process definitions like the scheduling control unit "SC3" illustrated in FIG. 8.

Figure 16:
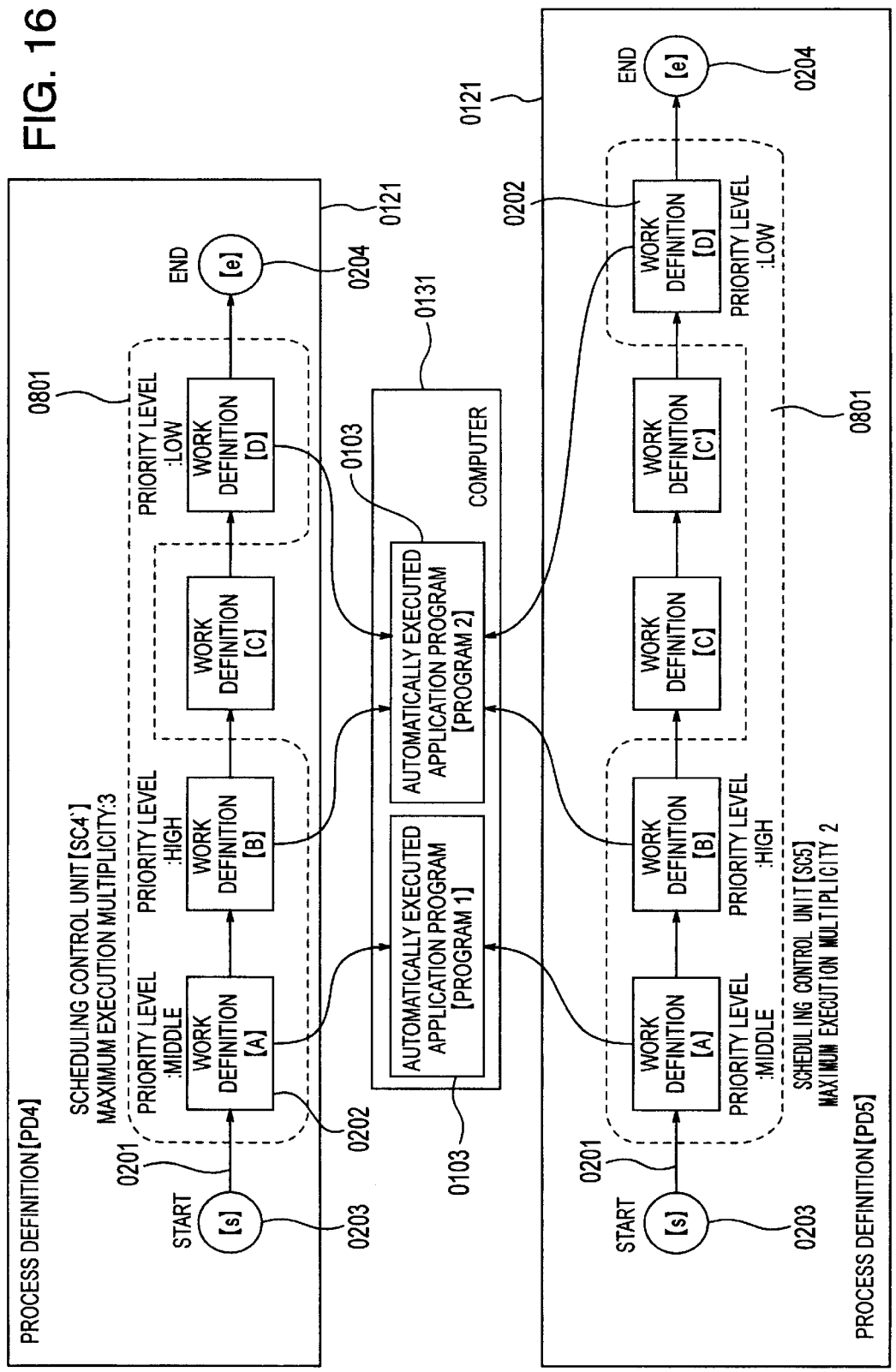
FIG. 16 is a flow diagram illustrating another exemplary definition for the application program execution schedule definition 0712.

An exemplary definition illustrated in FIG. 16 includes, in addition to the process definition "PD4" in FIG. 15, a process definition "PD5" which is a partially modified version of "PD4." The process definition "PD5" is identical to the process definition "PD4" except for addition of a work definition "C" which is classified as the "operator execution" work type. For this reason, the business processing associated with both work definitions "PD4:A" and "PD5:A" is executed by the automatically executed application program "Program 1," while the business processing associated with all of work definitions "PD4:B," "PD4:D," "PD5:B" and "PD5:D" is performed by the automatically executed application program "Program 2." Also, the automatically executed application programs "Program 1" and "Program 2 " run on the same computer. Further, in this event, like the example of FIG. 15, a scheduling control unit "SC4'" comprised of the work definitions "PD4:A," "PD4:B" and "PD4:D" is defined on the process definition "PD4," and a similar scheduling control unit "SC5" is defined on the process definition "PD5." In addition, the maximum execution multiplicity equal to 5, assigned to the scheduling control unit "SC4" in the example of FIG. 15, is distributed between the two scheduling control units "SC4'" and "SC5" in the example of FIG. 16, so that "SC4'" is assigned with the maximum execution multiplicity equal to 3 and "SC5" with the maximum execution multiplicity equal to 2. Thus, the computer resources associated with the business processing executed by the automatically executed application programs 0103 can be fixedly distributed between the two process definitions, and controlled for a load.

As has been seen in the two exemplary definitions, according to the present invention, the execution scheduling and load control for the business processing executed by the automatically executed application programs can be intuitively and readily set based on the process definition, which is a model of a business flow. It is also possible to make execution scheduling inherent to a business flow model.

In addition, according to the present invention, an execution scheduling method can be specified for the business processing by the automatically executed application programs not in units of application program but in units of work definition. With this feature, even if an automatically executed application program is shared among different work definitions, the execution scheduling and load control can be flexibly set in detail for each of work definitions. It is also possible to set scheduling across different business flows.

For example, as can be seen in the exemplary definition in FIG. 15, the processing priority level can be assigned to a plurality of work definitions which share the same automatically executed application program in accordance with requirements to the scheduling associated with a business flow model.

Also, as can be seen in the exemplary definition in FIG. 16, even when an automatically executed application program is shared or a computer for processing application programs is shared by different business flows, it is possible to individually specify the maximum execution multiplicity for each business flow, and thereby avoid mutual interference caused by a contention for computer resources among business flows.

It can be said that such execution scheduling and load control for application programs in the work flow management system become increasingly important particularly in recent technical background, as described below.

For example, the technology of work flow control management system is used for associating business systems with each other in the field of EAI (Enterprise Application Integration) (EAI Journal, September/October 1999, pp. 49–53), and as the technology is applied more to basic businesses having more complicated business procedures, the execution of application programs is controlled in more process instances without intervention of human in the work flow management system. With this tendency, it is necessary to stably control the execution of application program processing in a high traffic work flow execution environment in winch a variety of business flows mixedly exist. In addition, it is also necessary to be able to appropriately and readily set and define the execution scheduling and load control Also, in recent years, application hosting services such as ASP (Application Service Provider) have drawn attention (Nikkei Internet Technology, 1998 August issue, pp. 98–105). Similar service provision form is contemplated as well in applications using work flow management systems. For providing an application hosting service, it is necessary to appropriately manage the amount of computer resources used for each client and business for restriction and charging. The present invention is effective in such application field as well.

In the following, an embodiment of the present invention applied to an ASP service will be shown.

In this embodiment, a service quality is defined in the following two ways such that users can be charged in accordance with the quality. Specifically, as a first service provision method, the amount of maximum available computer resources in each contract of a user is fixedly determined to provide services within the set amount of computer resources at all times. In this method, the user is charged for provided services in accordance with the set amount of computer resources. A second service provision method permits a plurality of users to share a fixed amount of computer resources such that the shared computer resources are dynamically distributed in accordance with a processing priority which is set for each contract. In this method, the user is charged with a service rate in accordance with the processing priority assigned to him. In this event, while the user is not always ensured to receive a consistent amount of services, the user may make a contract with a lower priority, for example, if the urgency is low for business processing, to cut down on the cost. It should be noted however that with such a contract, the ASP-based service could be provided only during a time zone in which extra computer resources are available, such as during the night.

In this embodiment, a process definition is provided for each contract of a user to manage the contract in correspondence to the process definition. Even if business services provided for different users follow similar business flows, an individual process definition must be made for each user. However, considering that the process definition will have to be customized for each user at later time, it is natural to make process definitions separately for each of contracts.

Assume that in this embodiment, the amount of computer resources used by an entire business flow is subjected to charging, but the amount of computer resources used for partial work definitions in the business flow is not controlled for simplicity.

Figure 17:
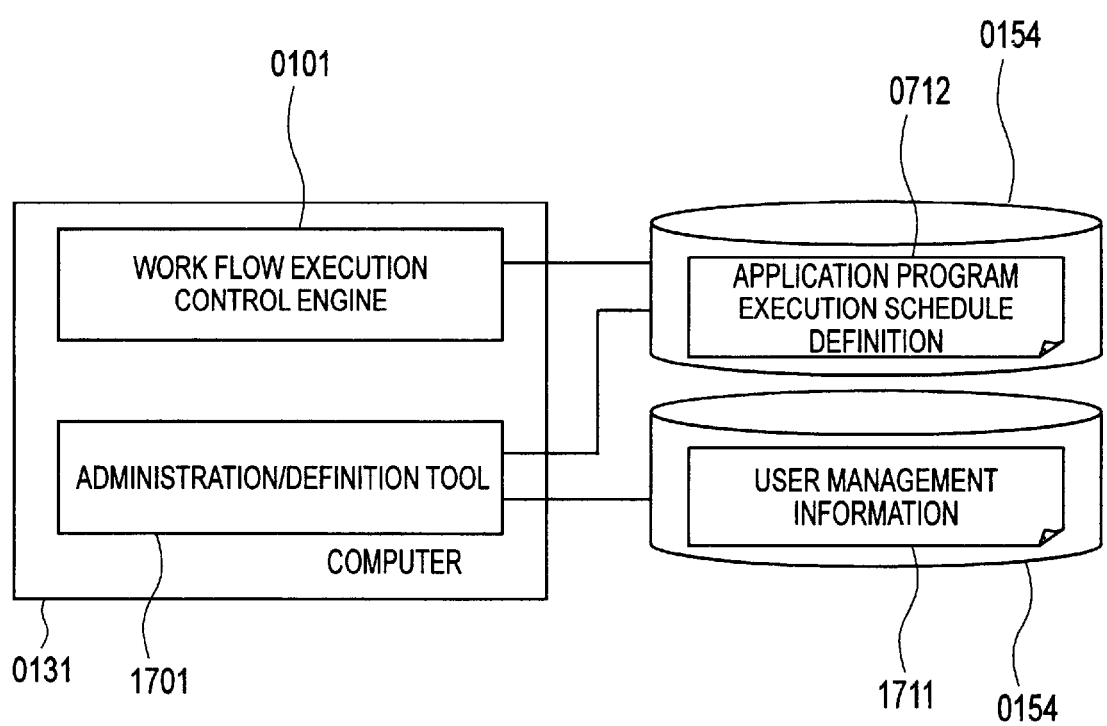
FIG. 17 is a block diagram illustrating the system configuration in one embodiment of the present invention which shows an application of the present invention to an ASP service.

FIG. 17 illustrates the system configuration in this embodiment. The illustrated system configuration comprises user management information 1711 and administration/definition tool 1701 in addition to the system configurations illustrated in FIGS. 1 and 7. FIG. 17 only describes the difference without details on the whole system configuration. The user management information 1711 holds contents of a contract made by each user for a service provided by ASP, and is used as management information for ensuring the quality of and charging for the service provided for each of contracts made by users. Also, a application program execution schedule definition 0712 is updated in accordance with the contents of the contracts stored in this table. The information is edited by the administration/definition tool 1701. The administration/definition tool 1701 is a software program which runs on a computer 0131 similarly to other software programs.

Figure 18:
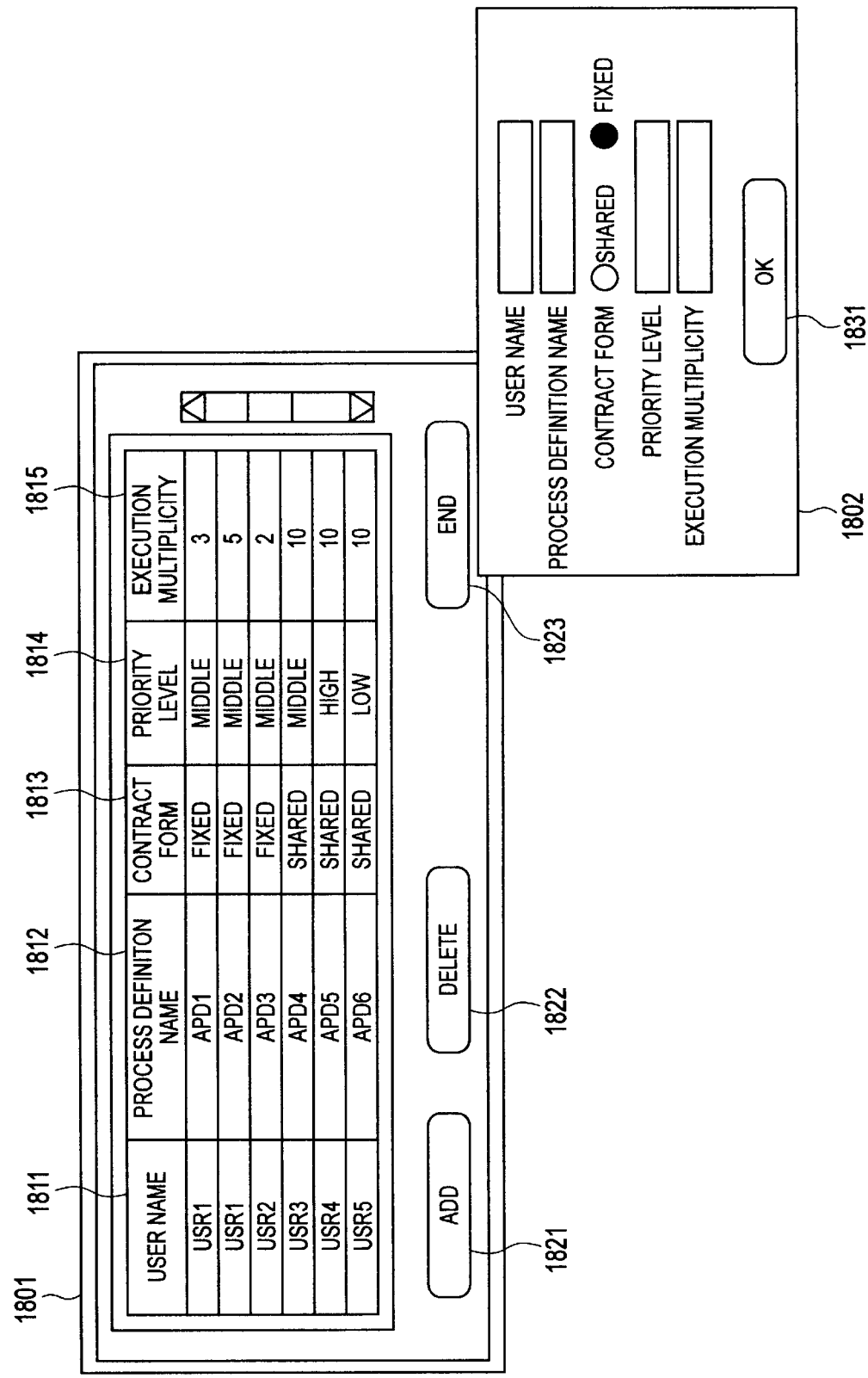
FIG. 18 is a diagram illustrating a display screen of an administration/definition tool 1701.

FIG. 18 illustrates an example of a screen displayed for the administration/definition tool 1701. Each of rows in a contract list 1801 indicates a contract for a business service. In each contract, a user name 1811 indicates the name of a user who has made the contract; a process definition name 1812 indicates a process definition used in the contract; a contract form 1813 indicates a contract form, either "fixed" or "shared" depending on the difference in the service provision method; and a priority level 1804 indicates a processing priority level in a group of sharing users when the contract form 1813 is classified as "shared." Also, an execution multiplicity 1815 indicates a processing execution multiplicity assigned to the contract when the contract form 1813 is classified as "fixed" and a processing execution multiplicity assigned to the entirety of the group of sharing users when the contract form 1813 is classified as "shared." For this reason, the execution multiplicity 1815 has the same value for all contracts which are classified as "shared" in the contract form 1813, and when the value is changed in any contract, the changed value is reflected to all other contracts classified as the "shared" contract form. In the figure, the execution multiplicity 1815 for sharing groups is set at "10." An ADD button 1821 and a DELETE button 1822 may be used to add a new contract in the contract list 1801 or selectively delete an existing contract. For adding a new contract, an editing screen 1802 is displayed. On the editing screen 1802, after information is entered for setting in each of the items of the table, the added settings are established with an OK button 1831. The administration/definition tool 1701 can be terminated by depressing an END button 1823. When a new contract is added to or deleted from the contract list 1801, the administration/definition tool 1701 updates the user management information 1711 and the application program execution schedule definition 0712. Detains on the update processing will be described later.

FIG. 19 shows a format in which the user management information 1711 is stored in the auxiliary storage device 0154. Columns of the user management information table 1901, i.e., a user name 1911, a process definition name 1912, a contract form 1913, a priority 1914, and an execution multiplicity 1915 correspond respectively to identically labeled columns of the contract list 1801 on the display screen of the administration/definition tool 1701, so that contents of each contract displayed on the contract list 1801 are stored as they are in the respective rows of the user management information table 1901.

Figure 20:
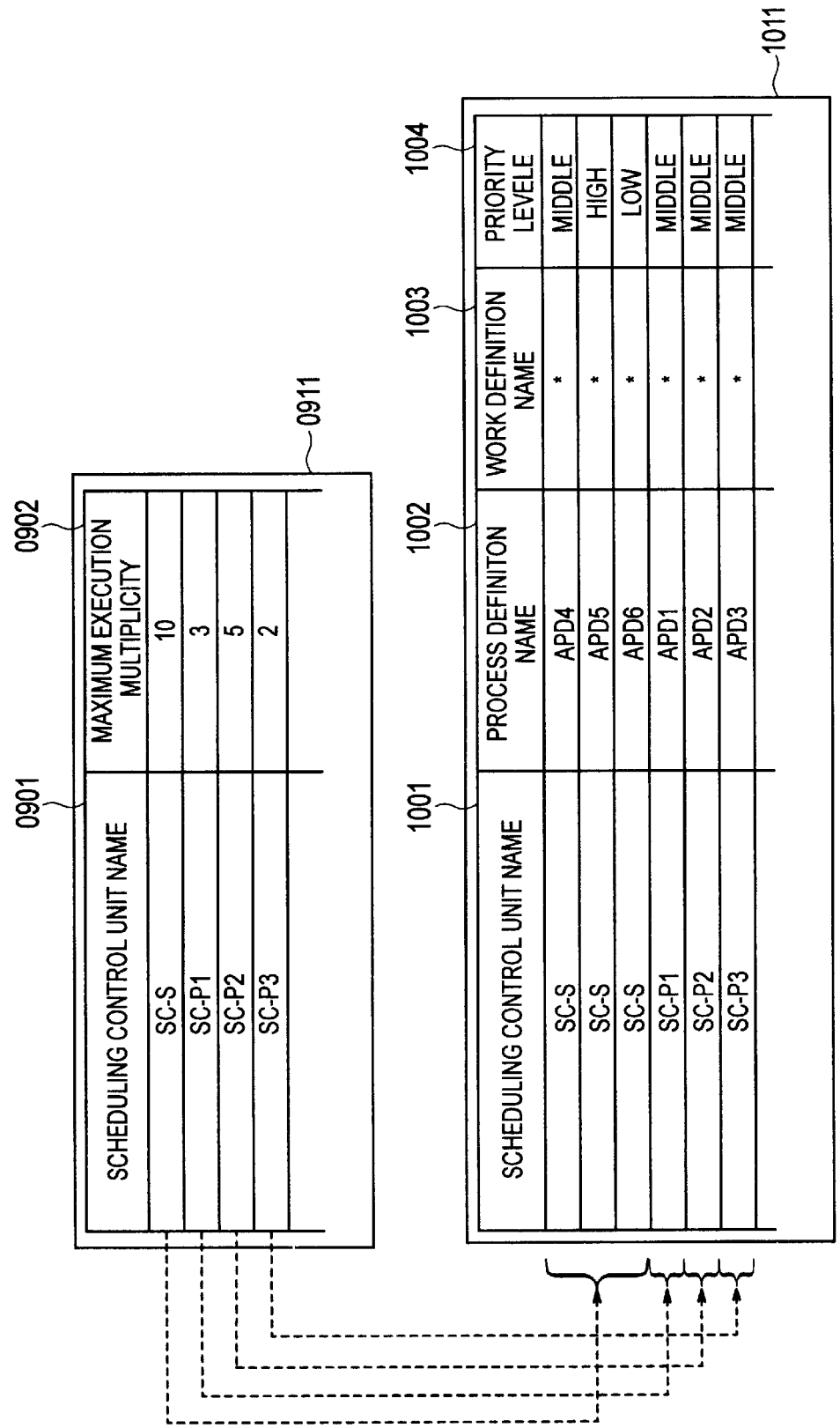
FIG. 20 is a diagram showing an exemplary definition for a application program execution schedule definition 0712 in one embodiment of the present invention which shows an application of the present invention to an ASP service.

FIG. 20 shows set information correspondingly stored in the application program execution schedule definition 0712 when the contents of the user management information 1711 are as shown in the respective records in FIG. 19. A scheduling control unit definition information table 0911 in FIG. 20 includes a single scheduling control unit "SC-S" shared by all contracts classified as the "shared" contract form, and a plurality of scheduling control units "SC-P1," "SC-P2 ," "SC-P3 " which are set to respective contracts classified as the "fixed" contact form. The scheduling control unit "SC-S" is shared by process definitions for all contracts classified as the "shared" contract form. In the scheduling control unit work definition information table 1011, each row having the scheduling control unit name 1001 set to "SC-S" is the process definition for the "shared" contract form. Process definitions "APD4 ," "APD5 ," "APD6 " fall under this category. Also, in the work definition name 1003, "*" means that all works classified as the "automatic execution" type in the process definitions are included in a specified scheduling control unit. Specifically, all works classified as the "automatic execution" type in the process definitions "APD4 ," "APD5 ," "APD6 " are included in the scheduling control unit "SC-S" and executed in computer resources which have the maximum execution multiplicity limited to "10." Next, the scheduling control units "SC-P1 ," "SC-P2 ," "SC-P3 " in the scheduling control unit definition information table 0911 are scheduling control units for contracts classified as the "fixed" contract form which correspond to the process definitions "APD-1 ," "APD-2 ," "APD3 ," respectively. For example, the scheduling control unit "SC-P1 " includes all works classified as the "automatic execution" type in the process definition "APD-1 " contracted by a user "USR-1 " and provides the maximum execution multiplicity equal to "3."

The following description will be made on details of an editing procedure performed by the administration/definition tool 1701 for editing the user management information 1711 and the application program execution schedule definition 1812. First, a processing procedure for adding a new contract will be described. At the outset, a record is added to the user management information table 1901 in accordance with respective set contents specified by the operation management tool 1701. Next, a record of a process definition specified by the administration/definition tool 1701 is inserted into the scheduling control unit work definition information table 1011. In this event, "*" is set in the work definition name 1003 for indicating all works classified as the "automatic execution" type in the same process definition, and values specified by the administration/definition tool 1701 are set in the process definition name 1002 and priority 1004. Also, the scheduling control unit "SC-S" is set in the scheduling control unit name 1001 when a newly added contract is classified as the "shared" contract form. On the other hand, when the newly added contract is classified as "fixed" contract form, a new scheduling control unit is added to the scheduling control unit definition information table 0911, and its name is set in the scheduling control unit name 1001. In this event, the maximum execution multiplicity 0902 of the newly added scheduling control unit is set equal to the execution multiplicity 1815 specified by the administration/definition tool 1701. Further, when the contract form is "shared," the value of the execution multiplicity 1815 is set to the maximum execution multiplicity 0902 of the scheduling control unit "SC-S," and the same value is set in the column 1915 labeled "execution multiplicity" of all records in the user management information table 1901 which are classified as the "shared" contract form.

Next, a processing procedure for deleting a contract will be described. First, a record for a contract specified by the administration/definition tool 1701 is searched using the process definition name 1912 as a key, and deleted from the user management information table 1901. Similarly, a corresponding record is deleted from the scheduling control unit work definition information table 1011 using the process definition name 1002 as a key. In this event, when a deleted contract is classified as the "fixed" contract form, a scheduling control unit corresponding to the process definition is also deleted from the scheduling control unit definition information table 0911.

It is now appreciated how the service quality is controlled for each contract in accordance with the application program execution schedule definition 0712 set and defined as described, as previously shown in the first embodiment. As can be seen from the foregoing, by applying the present invention to the ASP service, it is possible to control the service quality for each user's contract and charge each user for a particular service quality.

Next, an embodiment of the present invention will be shown for application program execution scheduling based not only on the simple control relying on the execution multiplicity but also on a more generalized computer resource use amount. Examples of computer resources include a usable memory amount, a usable disk amount, a usable CPU amount, database access amount/number of connections, a usable network amount, and so on. Here, as an example of controlling application program execution scheduling based on restriction on a plurality of types of usable computer resources, i.e., a usable memory amount (a first type of computer resource) and usable disk amount (a second type of computer resource) are used in combination. For avoiding redundant description, only differences with the first embodiment will be described below.

FIG. 21 shows a application program usable resource information table 2101 which has previously set and stored the amount of computer resources used by each application program. The application program usable resource information table 2101 is stored in the auxiliary storage device 0154, and referenced by the application program execution planning unit 0702. The application program usable resource information table 2101 is comprised of the following columns: application program information 2111 for identifying a application program; and a usable memory amount 2112 and a usable disk amount 2112 for use by the application program. In FIG. 21, for example, a application program "Program 1" uses "1 MB" of memory and "10 MB" of disk for executing one piece of business processing. For the remaining application programs, similarly, "Program 2" uses "10 MB" of memory and "100 MB" of disk; "Program 3" uses "50 MB" of memory and "50 MB" of disk; and "Program 4" uses "30 MB" of memory and "200 MB" of disk.

FIG. 22 shows an extended scheduling control unit definition information table 2201 for managing a maximum use resource amount available in each scheduling control unit. In this embodiment, a maximum usable memory amount 2212 and a maximum usable disk amount 2213 are determined for each of scheduling control units, and can be identified by a scheduling control• name 2211. The extended scheduling control unit definition information table 2201 is used in place of the scheduling control unit definition information table 0911 in the first embodiment. In the example of FIG. 22, a maximum usable memory amount "1 GB" and a maximum usable disk amount "4 GB" are allocated to a scheduling control unit "SC 1"; a maximum usable memory amount "500 MB" and a maximum usable disk amount "2 GB" to a scheduling control unit "SC2"; a maximum usable memory amount "200 MB" and a maximum usable disk amount "1 GB" to a scheduling control unit "SC3." In works belonging to each scheduling control unit, the execution of business processing by an automatically executed application program 0103 is controlled by the application program execution planning unit 0702 such that the set maximum usable memory amount and maximum usable disk amount are not exceeded in the entire scheduling control unit.

In this embodiment, the function of the application program execution planning unit 0702 is extended to make a plan for executing the application programs within a range of a plurality of generalized computer resource amounts as well as based on the execution multiplicity. Since the execution multiplicity can be regarded as one of such generalized computer resources, it can be handled similarly to other computer resources in this extension. The following description will be made on details on a processing procedure performed by the application program execution planning unit 0702 which is functionally extended to make an execution plan for a plurality of generalized computer resources.

First described will be a processing procedure involved in "initial processing" of the application program execution planning unit 0702. As previously described in the first embodiment, the "initial processing" of the application program execution planning unit 0702 is executed only once when the work flow execution control engine 0101 is started. First, in this processing, the unit 0702 searches the extended scheduling control unit definition information table 2201 in the application program execution schedule definition 0712 to acquire a list of scheduling control units. Next, the unit 0702 reserves a variable region for holding a current used resource amount of each computer resource for each of the scheduling control units, and initializes currently used resource amounts to zero. Here, two variable regions are provided for holding the values of usable memory amount and usable disk amount. Finally, an execution planning processing starting trigger is woken up in the application program execution planning unit 0702.

As previously described in the first embodiment, in response to the generation of the execution plan processing starting trigger, the application program execution planning unit 0702 starts the "execution planning processing." A detailed processing procedure for the "execution planning processing" will be shown below with reference to flow charts of FIGS. 23 and 24.

Figure 23:
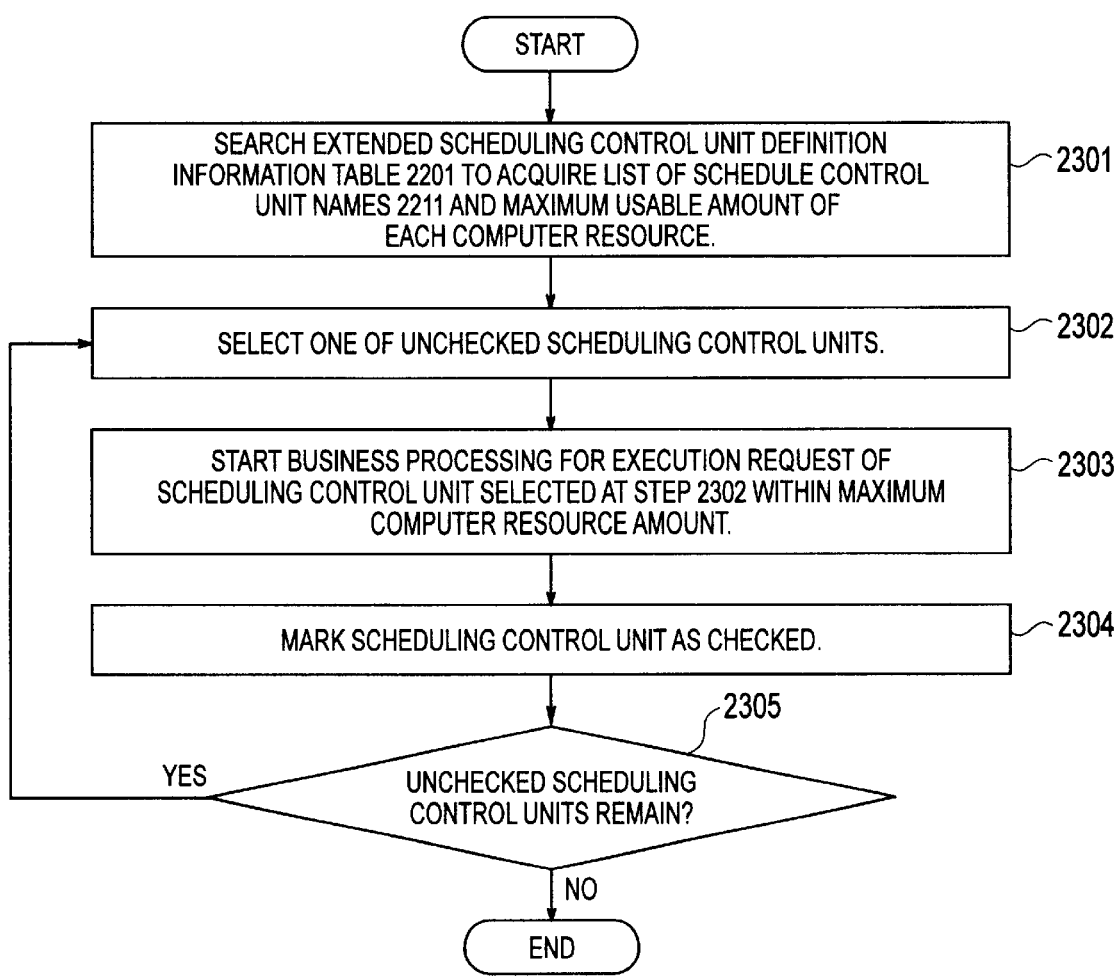
FIG. 23 is a flow chart illustrating the operation of execution plan processing performed by the work flow execution planning unit 0702 in the embodiment in which general computer resources are limited.
Figure 24:
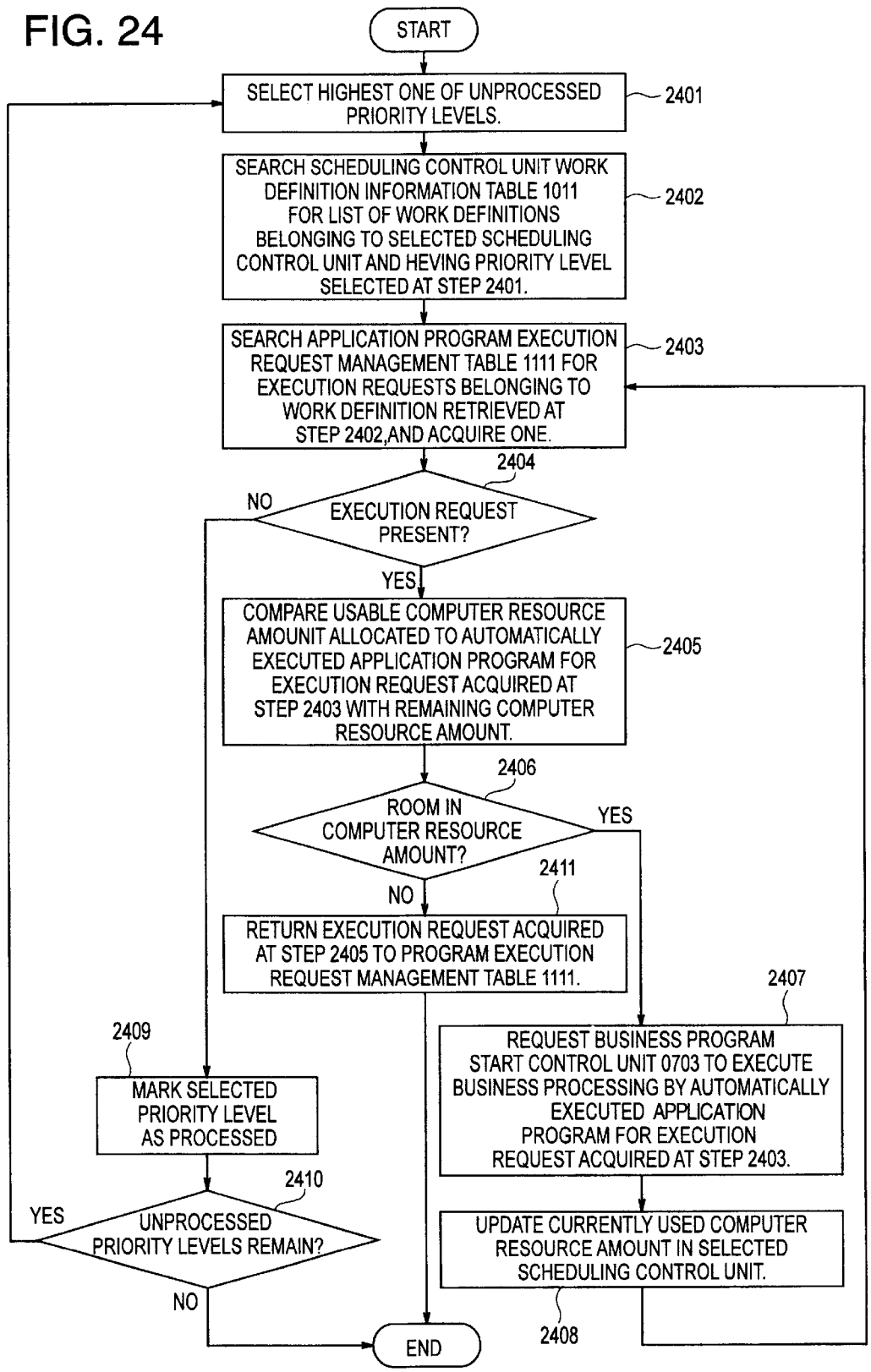
FIG. 24 is a flow chart illustrating details of step 2302 in FIG. 23.

In the processing procedure illustrated in FIG. 23, the unit 0702 acquires a list of scheduling control units, and starts requesting the execution of an automatically executed application program within a maximum computer resource amount available in each scheduling control unit. The following description will be made in detail along the steps of the flow chart. The unit 0702 searches the extended scheduling control unit definition information table 2201 in the application program execution schedule definition 0712 to acquire a list of scheduling control units (step 2301). In this event, the unit 0702 also acquires the maximum usable amounts of the respective computer resources (maximum usable memory amount and maximum usable disk amount). Next, the unit 0702 selects an unchecked scheduling control unit from the list of scheduling control units acquired at step 2301 (step 2302). The unit 0702 starts a request for executing an automatically executed application program in the schedule control unit within the maximum usable computer resource amount available therefor (step 2303). The processing at this step will be described later in detail with reference to the flow chart of FIG. 24. The scheduling control unit selected at step 2302 is marked as checked (step 2304). If any unchecked scheduling control units still remain, the procedure returns to step 2302 to repeat similar processing (step 2305). When the procedure has been completed for all the scheduling control units, the "execution planning processing" is terminated.

Next, the processing at step 2303 in the flow chart of FIG. 23 will be described in detail with reference to FIG. 24. Specifically, FIG. 24 describes in greater detail the execution planning processing for a request for executing the business processing in a single scheduling control unit selected at step 2302. The following description will be made in detail along the steps of the flow chart. The unit 0702 selects the highest one from unprocessed priority levels (step 2401). The application program execution planning unit 0702 searches the scheduling control unit work definition information table 1011 for a list of work definitions which belong to the scheduling control unit selected at step 2303 in FIG. 23 and have the priority level selected at step 2401 (step 2402). The application program execution planning unit 0702 specifies the work definition list searched at step 2402 to invoke "execution request acquisition processing" of the application program execution request management unit 0701 (step 2403). In this way, the execution request having the earliest created date/time can be acquired from those belonging to the specified work definitions. When the execution request can be acquired at step 2403, the unit 0702 acquires the usable computer resource amounts 2112, 2113 allocated to a application program for the acquired execution request from the application program usable resource information table 2101 for comparison with the remaining computer resource amounts (step 2405). Specifically, the unit 0702 adds the currently used computer resource amount held in the variable region and the usable computer resource amount allocated to the application program for the acquired execution request to determine whether or not the sum exceeds the maximum computer resource amount available in the scheduling control unit. This determination is made for each type of computer resources (in this embodiment, two types of computer resources consisting of the usable memory amount and usable disk amount) to examine whether the maximum computer resource amount is exceeded in any type of computer resources. If the result of the comparison at step 2405 shows that the maximum computer resource amount is not exceeded in any type of computer resources, the unit 0702 requests the application program invocation control unit 0703 to instruct the automatically executed application program 0103 to execute the business processing for the execution request acquired at step 2403 (step 2407). Then, the unit 0702 updates the currently used computer resource amounts in the scheduling control unit to the latest status. Specifically, the computer resource amount after the addition, used in the comparison at step 2405, is saved in the variable region (step 2408). Subsequently, the procedure returns to step 2403 to repeat the foregoing processing. If the result of the comparison at step 2405 shows that the maximum computer resource amount is exceeded in even one type of computer resource, the unit 0702 invokes the application program execution request management unit 0701 to return the processing request acquired at step 2403 to the application program execution request management table 1111 (step 2411). Subsequently, the processing at step 2303 is completed. If no execution request has the selected priority level at step 2403, this priority level is marked as processed (step 2409). If unprocessed priority levels still remain, the flow returns to step 2401, where the unit 0702 again selects the next highest priority level and repeats the foregoing processing (step 2410).

Further, in the application program execution request management unit 0701, as shown at step 2411, it is necessary to additionally provide the processing for returning the once acquired processing request to the application program execution request management table 1111. This processing only involves inserting the processing request received from the application program execution planning unit 0702 simply into the application program execution request management table 1111.

As described above, this embodiment extends the first embodiment to enable an execution plan to be made for the business processing performed by the automatically executed application programs not only based on the execution multiplicity but also by limiting the amount of usable generalized computer resources. In this generalization, the control based on the execution multiplicity in the first embodiment may be handled as one type of computer resource.

As appreciated from the foregoing, the work flow management can be realized in consideration of the allocation of computer resources for use by application programs which execute the processing involved in respective works.

What is claimed is:

1. A work flow management method for managing execution of a plurality of works in a business process based on process definition information which is held for defining said plurality of works and a processing order of said works, said method comprising the steps of:

holding control information which stores each said work and the number of times a application program can execute processing associated with said work in correspondence to each other;

when said application program for performing the processing associated with said work must be executed, determining whether the number of times said application program has already been executed is less than a predetermined value stored in said control information corresponding to said work which must be executed; and executing said application program which must be executed when said number is less than said predetermined value.

2. A work flow management method according to claim 1, further comprising:

defining a work group comprised of a plurality of said works;

holding control information which stores the number of times a application program can execute processing associated with the works belonging to said work group and said work group in correspondence to each other;

upon said determination, identifying said work group including said work which must be executed; and comparing the number of application programs previously executed in the works belonging to said work group with a predetermined value stored in said control information corresponding to said work group.

3. A work flow management method according to claim 2, further comprising:

when a plurality of said works must be executed, selecting a work based on priority levels previously set to said works.

4. A work flow management method for managing execution of a plurality of works in a business process based on process definition information which is held for defining said plurality of works and a processing order of said works, said method comprising the steps of:

holding control information which stores each said work and a computer resource amount available for execution of application program processing associated with said work in correspondence to each other;

when a application program for performing the processing associated with said work must be executed, determining whether the sum of a computer resource amount used by a previously executed application program and a computer resource amount for use by said application program which must be executed is equal to or less than a predetermined value stored in said control information corresponding to said work which must be executed; and executing said application program which must be executed when said sum is equal to or less than said predetermined value.

5. A work flow management method according to claim 4, further comprising:

defining a work group comprised of a plurality of said works;

holding control information which stores a computer resource amount available for execution of application program processing associated with the works belonging to said work group and said work group in correspondence to each other;

upon said determination, identifying said work group including said work which must be executed; and comparing the sum of a computer resource amount used by previously executed application programs and a computer resource amount for use by said application program which must be executed with a predetermined value stored in said control information corresponding to said work group.

6. A work flow management method according to claim 4, wherein:

said computer resource is the amount of memory used by said application program which is executing.

7. A work flow management method according to claim 4, wherein:

said computer resource is a disk capacity used by said application program which is executing.

8. A work flow management method for managing execution of a plurality of works in a business process based on process definition information which is held for defining said plurality of works and a processing order of said works, said method comprising the steps of:

holding control information which stores each said work and the number of times a application program can execute processing associated with said work in correspondence to each other;

when said application program for performing the processing associated with said work must be executed, determining whether the number of times said application program has already been executed is less than a predetermined value stored in said control information corresponding to said work which must be executed; and outputting an execution request for instructing execution of said application program which must be executed when said number is less than said predetermined value.

9. A work flow management method for managing execution of a plurality of works in a business process based on process definition information which is held for defining said plurality of works and a processing order of said works, said method comprising the steps of:

holding control information which stores each said work and a computer resource amount available for execution of application program processing associated with said work in correspondence to each other;

when a application program for performing the processing associated with said work must be executed, determining whether the sum of a computer resource amount used by a previously executed application program and a computer resource amount for use by said application program which must be executed is equal to or less than a predetermined value stored in said control information corresponding to said work which must be executed; and outputting an execution request for instructing execution of said application program which must be executed when said sum is equal to or less than said predetermined value.

10. A work flow management system which holds process definition information for defining a plurality of works in a business process and a processing order of said works for managing execution of said works based on said process definition information, said system comprising:

storage means for holding control information which stores each said work and the number of times a application program can execute processing associated with said work in correspondence to each other;

determining means operative when said application program for performing the processing associated with said work must be executed for determining whether the number of times said application program has already been executed is less than a predetermined value stored in said control information corresponding to said work which must be executed; and executing means for executing said application program which must be executed when the result of the determination in said determining means shows that said number is less than said predetermined value.

11. A work flow management system according to claim 10, wherein:

said system defines a work group comprised of a plurality of said works, and holds control information which stores the number of times a application program can execute processing associated with the works belonging to said work group and said work group in correspondence to each other, and said determining means, upon said determination, identifies said work group including said work which must be executed, and compares the number of application programs previously executed in the works belonging to said work group with a predetermined value stored in said control information corresponding to said work group.

12. A work flow management system according to claim 11, wherein:

when a plurality of said works must be executed, a work is selected based on priority levels previously set to said works.

13. A work flow management system which holds process definition information for defining a plurality of works in a business process and a processing order of said works for managing execution of said works based on said process definition information, said system comprising:

storage means for holding control information which stores each said work and a computer resource amount available for execution of application program processing associated with said work in correspondence to each other;

determining means operative when a application program for performing the processing associated with said work must be executed for determining whether the sum of a computer resource amount used by a previously executed application program and a computer resource amount for use by said application program which must be executed is equal to or less than a predetermined value stored in said control information corresponding to said work which must be executed; and executing means for executing said application program which must be executed when the result of the determination in said determining means shows that said sum is equal to or less than said predetermined value.

14. A work flow management system according to claim 13, wherein:

said system defines a work group comprised of a plurality of said works, holds control information which stores a computer resource amount available for execution of application program processing associated with the works belonging to said work group and said work group in correspondence to each other, and said determining means, upon said determination, identifies said work group including said work which must be executed, and compares the sum of a computer resource amount used by previously executed application programs and a computer resource amount for use by said application program which must be executed with a predetermined value stored in said control information corresponding to said work group.

15. A work flow management system which holds process definition information for defining a plurality of works in a business process and a processing order of said works for managing execution of said works based on said process definition information, said system comprising:

storage means for holding control information which stores each said work and the number of times a application program can execute processing associated with said work in correspondence to each other;

determining means operative when said application program for performing the processing associated with said work must be executed for determining whether the number of times said application program has already been executed is less than a predetermined value stored in said control information corresponding to said work which must be executed; and outputting means for outputting an execution request for instructing execution of said application program which must be executed when the result of the determination in said determining means shows that said number is less than said predetermined value.

16. A work flow management system which holds process definition information for defining a plurality of works in a business process and a processing order of said works for managing execution of said works based on said process definition information, said system comprising:

storing means for system holding control information which stores each said work and a computer resource amount available for execution of application program processing associated with said work in correspondence to each other;

determining means operative when a application program for performing the processing associated with said work must be executed for determining whether the sum of a computer resource amount used by a previously executed application program and a computer resource amount for use by said application program which must be executed is equal to or less than a predetermined value stored in said control information corresponding to said work which must be executed; and outputting means for outputting an execution request for instructing execution of said application program which must be executed when the result of the determination in said determining means shows that said sum is equal to or less than said predetermined value.

17. A computer readable medium having recorded thereon a work flow management program for managing execution of a plurality of works in a business process based on process definition information which is held for defining said plurality of works and a processing order of said works, said program comprising:

a holding function for holding control information which stores each said work and the number of times a application program can execute processing associated with said work in correspondence to each other;

a determining function operative when said application program for performing the processing associated with said work must be executed for determining whether the number of times said application program has already been executed is less than a predetermined value stored in said control information corresponding to said work which must be executed; and an executing function for executing said application program which must be executed when the result of the determination in said determining function shows that said number is less than said predetermined value.

18. A computer readable medium having recorded thereon a work flow management program for managing execution of a plurality of works in a business process based on process definition information which is held for defining said plurality of works and a processing order of said works, said program comprising:

a holding function for holding control information which stores each said work and a computer resource amount available for execution of application program processing associated with said work in correspondence to each other;

a determining function operative when a application program for performing the processing associated with said work must be executed for determining whether the sum of a computer resource amount used by a previously executed application program and a computer resource amount for use by said application program which must be executed is equal to or less than a predetermined value stored in said control information corresponding to said work which must be executed; and an executing function for executing said application program which must be executed when the result of the determination in said determining function shows that said sum is equal to or less than said predetermined value.

19. A computer readable medium having recorded thereon a work flow management program for managing execution of a plurality of works in a business process based on process definition information which is held for defining said plurality of works and a processing order of said works, said program comprising:

a holding function for holding control information which stores each said work and the number of times a application program can execute processing associated with said work in correspondence to each other;

a determining function operative when said application program for performing the processing associated with said work must be executed for determining whether the number of times said application program has already been executed is less than a predetermined value stored in said control information corresponding to said work which must be executed; and an outputting function for outputting an execution request for instructing execution of said application program which must be executed when the result of the determination in said determining function shows that said number is less than said predetermined value.

20. A computer readable medium having recorded thereon a work flow management program for managing execution of a plurality of works in a business process based on process definition information which is held for defining said plurality of works and a processing order of said works, said program comprising:

a holding function for holding control information which stores each said work and a computer resource amount available for execution of application program processing associated with said work in correspondence to each other;

a determining function operative when a application program for performing the processing associated with said work must be executed for determining whether the sum of a computer resource amount used by a previously executed application program and a computer resource amount for use by said application program which must be executed is equal to or less than a predetermined value stored in said control information corresponding to said work which must be executed; and an outputting function for outputting an execution request for instructing execution of said application program which must be executed when the result of the determination in said determining function shows that said sum is equal to or less than said predetermined value.

21. A work flow management program for managing execution of a plurality of works in a business process based on process definition information which is held for defining said plurality of works and a processing order of said works, said program comprising:

a holding function for holding control information which stores each said work and a computer resource amount available for execution of application program processing associated with said work in correspondence to each other;

a determining function operative when a application program for performing the processing associated with said work must be executed for determining whether the sum of a computer resource amount used by a previously executed application program and a computer resource amount for use by said application program which must be executed is equal to or less than a predetermined value stored in said control information corresponding to said work which must be executed; and an executing function for executing said application program which must be executed when the result of the determination in said determining function shows that said sum is equal to or less than said predetermined value.

22. A work flow management program for managing execution of a plurality of works in a business process based on process definition information which is held for defining said plurality of works and a processing order of said works, said program comprising:

a holding function for holding control information which stores each said work and the number of times a application program can execute processing associated with said work in correspondence to each other;

a determining function operative when said application program for performing the processing associated with said work must be executed for determining whether the number of times said application program has already been executed is less than a predetermined value stored in said control information corresponding to said work which must be executed; and an outputting function for outputting an execution request for instructing execution of said application program which must be executed when the result of the determination in said determining function shows that said number is less than said predetermined value.

23. A work flow management program for managing execution of a plurality of works in a business process based on process definition information which is held for defining said plurality of works and a processing order of said works, said program comprising:

a holding function for holding control information which stores each said work and a computer resource amount available for execution of application program processing associated with said work in correspondence to each other;

a determining function operative when a application program for performing the processing associated with said work must be executed for determining whether the sum of a computer resource amount used by a previously executed application program and a computer resource amount for use by said application program which must be executed is equal to or less than a predetermined value stored in said control information corresponding to said work which must be executed; and an outputting function for outputting an execution request for instructing execution of said application program which must be executed when the result of the determination in said determining function shows that said sum is equal to or less than said predetermined value.

24. A work flow management method for managing execution of a plurality of works in a business process based on process definition information which is held for defining said plurality of works and a processing order of said works, said method comprising the steps of:

inputting each said work and a maximum number of executions of a application program for processing said work in correspondence to each other; and executing said application program for processing said work based on said maximum number of executions to limit the number of executions of said application program to said maximum number of executions or less.

25. A work flow management method for managing execution of a plurality of works in a business process based on process definition information which is held for defining said plurality of works and a processing order of said works, said method comprising the steps of:

inputting each said work and a maximum computer resource amount available to a application program for processing said work in correspondence to each other; and executing said application program for processing said work based on said maximum computer resource amount to limit a computer resource amount used by said executed application program to said maximum computer resource amount or less.

* * * * *